United States Patent [19]

Sueyoshi et al.

[11] Patent Number: 5,362,811
[45] Date of Patent: Nov. 8, 1994

[54] PROCESS FOR PREPARING CYCLOOLEFIN RANDOM COPOLYMER PELLETS

[75] Inventors: Tomoko Sueyoshi; Kenji Wakatsuru; Masayuki Okabe, all of Kuga, Japan

[73] Assignee: Mitsui Petrochemical Industries, Ltd., Tokyo, Japan

[21] Appl. No.: 187,910

[22] Filed: Jan. 28, 1994

[30] Foreign Application Priority Data

Jan. 29, 1993 [JP] Japan .................................. 5-014199

[51] Int. Cl.$^5$ .......................... C08J 3/12; C08L 23/08; C08L 45/00
[52] U.S. Cl. .................................... 525/198; 525/210; 528/491; 528/493; 528/494; 528/495; 526/281
[58] Field of Search ................ 525/210, 198; 528/491, 528/493, 494, 495; 526/281

[56] References Cited

U.S. PATENT DOCUMENTS

| | | |
|---|---|---|
| 4,614,778 | 9/1986 | Kajiura et al. |
| 4,874,808 | 10/1989 | Minami et al. |
| 4,918,133 | 4/1990 | Moriya et al. |
| 5,043,421 | 8/1991 | Golba et al. |
| 5,128,446 | 7/1992 | Hayashi et al. |
| 5,142,007 | 8/1992 | Sogane et al. |
| 5,179,171 | 1/1993 | Minami et al. |
| 5,225,503 | 7/1993 | Sogane et al. |

FOREIGN PATENT DOCUMENTS 61-98780 5/1986 Japan.
61-115916 6/1986 Japan.
61-120816 6/1986 Japan.

*Primary Examiner*—Carman J. Seccuro, Jr.
*Attorney, Agent, or Firm*—Sherman and Shalloway

[57] ABSTRACT

Disclosed is a process for preparing cycloolefin random copolymer pellets, comprising adding an organic polar solvent to a solution of a copolymer obtained by copolymerizing ethylene and a specific cycloolefin and if desired an α-olefin other than ethylene, in an amount exceeding such an amount that the liquid mixture exhibits the cloud point, separating the copolymer solution utilizing phase separation phenomenon into a concentrated phase containing the cycloolefin random copolymer in a high concentration and a dilute phase containing said copolymer in a low concentration, feeding the obtained concentrated phase to an extruder where the solvents are removed and the copolymer is melted during extrusion processing, followed by pelletizing the copolymer. According to the invention, the steps for preparing cycloolefin random copolymer pellets can be reduced, and moreover, mold staining can De inhibited in the molding process of the resultant pellets because the pellets have low contents of the low molecular weight copolymer, the unreacted monomer, etc.

3 Claims, 2 Drawing Sheets

PROCESS FOR PREPARING CYCLOOLEFIN RANDOM COPOLYMER PELLETS

FIELD OF THE INVENTION

The present invention relates to a process for preparing cycloolefin random copolymer pellets, and more particularly to such a process for preparing cycloolefin random copolymer pellets that the steps for preparing pellets can be reduced and mold staining can be prevented when a molded product is formed from the resultant pellets.

BACKGROUND OF THE INVENTION

The present inventors have proposed a variety of cycloolefin random copolymers formed from ethylene and specific cycloolefins, as described in, for example, Japanese Patent Laid-Open Publication No. 168708/1985 and Japanese Patent Applications No. 220550/1984, No. 236828/1984, No. 236829/1984 and No. 242336/1984. The cycloolefin random copolymers described in those publication and applications have high transparency and are excellent in various properties such as heat resistance, thermal aging resistance, chemical resistance, solvent resistance, dielectric properties and mechanical properties. Further, such cycloolefin random copolymers have good adhesion to substrates of various materials, though they are a kind of polyolefins. Accordingly, the cycloolefin random copolymer can be used, for example, in a field of optical materials such as optical memory discs and optical fibers, and a field of transparent container materials and packaging materials such as transparent films and transparent containers.

The cycloolefin random copolymer is conventionally used in the form of pellets for the production of molded articles. In the conventional process for preparing pellets, as shown in FIG. 2, a large number of steps are required prior to pelletizing the cycloolefin random copolymer, such as steps of polymerization, deashing, filtration, precipitation-filtration, extraction-filtration, drying, and addition of stabilizer. After these steps, the cycloolefin random copolymer is fed to an extruder, melted in the extruder, and pelletized. That is, the cycloolefin random copolymer is generally prepared by copolymerizing ethylene and a cycloolefin in a hydrocarbon solvent in the presence of a catalyst, so that steps for removing the catalyst and the solvent are required prior to the pelletizing step. Further, the unreacted cycloolefin, a low molecular weight cycloolefin random copolymer, etc., which might cause mold staining in the molding process of the resultant pellets, still remain in the hydrocarbon solvent, so that they also must be removed prior to the pelletizing step.

For preparing the cycloolefin random copolymer pellets, therefore, the catalyst, the reaction solvent, the unreacted cycloolefin and the low molecular weight cycloolefin random copolymer are removed through the above-mentioned many steps.

The cycloolefin random copolymer must go through a large number of steps prior to the pelletizing step as described above, and hence the cost for preparing the pellets becomes relatively high. Moreover, as a result of studies by the present inventors, they have found that the optical properties of the cycloolefin random copolymer, such as transparency, tends to lower every time the copolymer goes through each step after the polymerization step, though the lowering level is very low.

OBJECT OF THE INVENTION

It is, therefore, an object of the present invention to provide a process for preparing cycloolefin random copolymer pellets in which the steps for preparing pellets can be reduced, mold staining hardly takes place when the resultant pellets are molded into a product, and inherent properties in the copolymer such as optical properties are not marred.

SUMMARY OF THE INVENTION

The first process for preparing cycloolefin random copolymer pellets according to the present invention comprises the steps of:

adding an organic polar solvent to a copolymer solution containing a cycloolefin random copolymer [A] obtained by copolymerizing ethylene and at least one cycloolefin represented by the following formula (I) or (II) in a hydrocarbon solvent in the presence of a catalyst, in an amount exceeding such an amount that the copolymer solution exhibits the cloud point, to give a liquid mixture;

separating the liquid mixture into a lower phase containing the cycloolefin random copolymer [A] in a high concentration and an upper phase containing the copolymer [A] in a low concentration;

feeding the lower phase separated to an extruder where the solvents are removed and the cycloolefin random copolymer is melted during extrusion processing; and pelletizing the cycloolefin random copolymer:

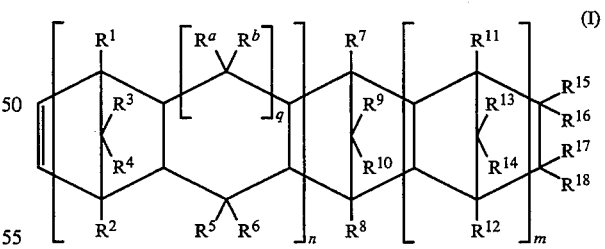

wherein n is 0 or 1; m is 0 or a positive integer; q is 0 or 1;

each of $R^1$–$R^{18}$, $R^a$ and $R^b$ is independently a hydrogen atom, a halogen atom or a hydrocarbon group;

$R^{15}$–$R^{18}$ may be linked with one another to form a monocyclic or polycyclic group which may have a double bond; and $R^{15}$ and $R^{16}$, or $R^{17}$ and $R^{18}$ may together form an alkylidene group; or

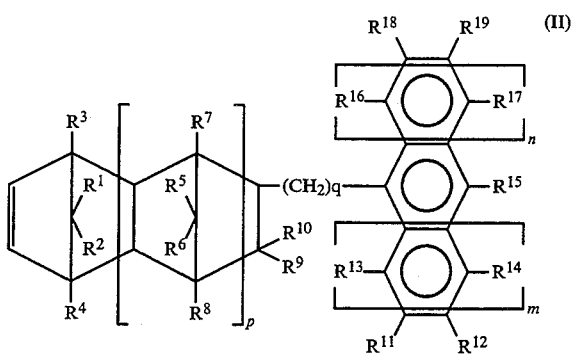

wherein each of p and q is independently 0 or an integer of 1 or more; each of m and n is independently 0, 1 or 2;

each of $R^1$–$R^{19}$ is independently a hydrogen atom, a halogen atom, a hydrocarbon group or an alkoxy group; the carbon atom to which $R^9$ and $R^{10}$ are linked may be bonded directly or by way of an alkylene group of 1–3 carbon atoms to the carbon atom to which $R^{13}$ is linked or the carbon atom to which $R^{11}$ is linked; and $R^{15}$ and $R^{12}$, or $R^{15}$ and $R^{19}$ may be linked together to form a monocyclic or polycyclic aromatic ring when each of n and m is 0.

The second process for preparing cycloolefin random copolymer pellets according to the present invention comprises the steps of:

adding an organic polar solvent to a cycloolefin random copolymer solution comprising:

a solution containing a cycloolefin random copolymer [B] which is obtained by copolymerizing ethylene and at least one cycloolefin represented by the above formula (I) or (II) in a hydrocarbon solvent in the presence of a catalyst, and has an intrinsic viscosity [η], as measured in decahydronaphthalene at 135° C., of 0.05 to 10 dl/g and a softening temperature (TMA) of not lower than 70° C., and a solution containing a cycloolefin random copolymer [C] which is obtained by copolymerizing ethylene and at least one α-olefin other than ethylene and at least one cycloolefin represented by the above formula (I) or (II) in a hydrocarbon solvent in the presence of a catalyst, and has an intrinsic viscosity [η], as measured in decahydronaphthalene at 135° C., of 0.01 to 10 dl/g and a softening temperature (TMA) of lower than 70° C. the amount of said solution of the copolymer [C] being in the range of 1 to 100 parts by weight based on 100 parts by weight of the solution of the copolymer [B], in an amount exceeding such an amount that the cycloolefin random copolymer solution exhibits the cloud point, to give a liquid mixture;

separating the liquid mixture into a lower phase containing the cycloolefin random copolymers [B] and [C] in high concentrations and an upper phase containing the copolymers [B] and [C] in low concentrations;

feeding the lower phase separated to an extruder where the solvents are removed and the cycloolefin random copolymers are melted during extrusion processing; and pelletizing the cycloolefin random copolymers.

The third process for preparing cycloolefin random copolymer pellets according to the present invention comprises the steps of:

adding an organic polar solvent to a cycloolefin random copolymer solution comprising:

a solution containing a cycloolefin random copolymer [B] which is obtained by copolymerizing ethylene and at least one cycloolefin represented by the above formula (I) or (II) in a hydrocarbon solvent in the presence of a catalyst, and has an intrinsic viscosity [η], as measured in decahydronaphthalene at 135° C., of 0.05 to 10 dl/g and a softening temperature (TMA) of not lower than 70° C., and a solution containing a cycloolefin random copolymer [D] which is obtained by copolymerizing ethylene, propylene and at least one cycloolefin represented by the above formula (I) or (II) or copolymerizing ethylene, 1-butene and at least one cycloolefin represented by the above formula (I) or (II) in a hydrocarbon solvent in the presence of a catalyst, and has an intrinsic viscosity [η], as measured in decahydronaphthalene at 135° C. of 0.01 to 10 dl/g and a softening temperature (TMA) of lower than 70° C. the amount of said solution of the copolymer [D] being in the range of 1 to 100 parts by weight based on 100 parts by weight of the solution of the copolymer [B], in an amount exceeding such an amount that the cycloolefin random copolymer solution exhibits the cloud point, to give a liquid mixture;

separating the liquid mixture into a lower phase containing the cycloolefin random copolymers [B] and [D] relatively in high concentrations and an upper phase containing the copolymers [B] and [D] in low concentrations;

feeding the lower phase separated to an extruder where the solvents are removed and the cycloolefin random copolymers are melted during extrusion processing; and pelletizing the cycloolefin random copolymers.

According to the present invention, the organic polar solvent is added to the cycloolefin random copolymer solution to form a phase-separated state whereby the unreacted cycloolefin and the low molecular weight cycloolefin random copolymer are transferred into the low-concentration (dilute) phase (i.e., the upper phase), the high-concentration (concentrated) phase (i.e., the lower phase) containing the cycloolefin random copolymer in a high concentration is separated out, and the concentrated lower phase separated is fed to an extruder where the solvents (the hydrocarbon solvent and the organic polar solvent) are removed and the cycloolefin random copolymer is melted during extrusion processing, followed by the copolymer is pelletized. Thus, the steps for preparing the pellets can be prominently reduced and simplified as compared with the conventional pelletizing process as shown in FIG. 2. Further, the low molecular weight cycloolefin random copolymer and the unreacted cycloolefin, which cause mold staining, can be removed in larger amounts than those in the conventional process by transferring them into the dilute upper phase. As a result, mold staining hardly takes place in the molding process of the resultant pellets.

Furthermore, in the process for preparing pellets according to the present invention, the cycloolefin random copolymer in the form of a liquid mixture, not in the form of solid as in the conventional process, is fed to the extruder, so that shear stress applied to the copolymer can be markedly reduced whereby such as cross-linked get structure of copolymer (e.g., cyclohexane-insoluble fine particles having a diameter of not less than 1 μm) are hardly produced, and inherent excellent properties in the cycloolefin random copolymer are hardly marred.

DETAILED DESCRIPTION OF THE INVENTION

The process for preparing cycloolefin random copolymer pellets according to the present invention will be described in detail hereinafter.

Figure 1:
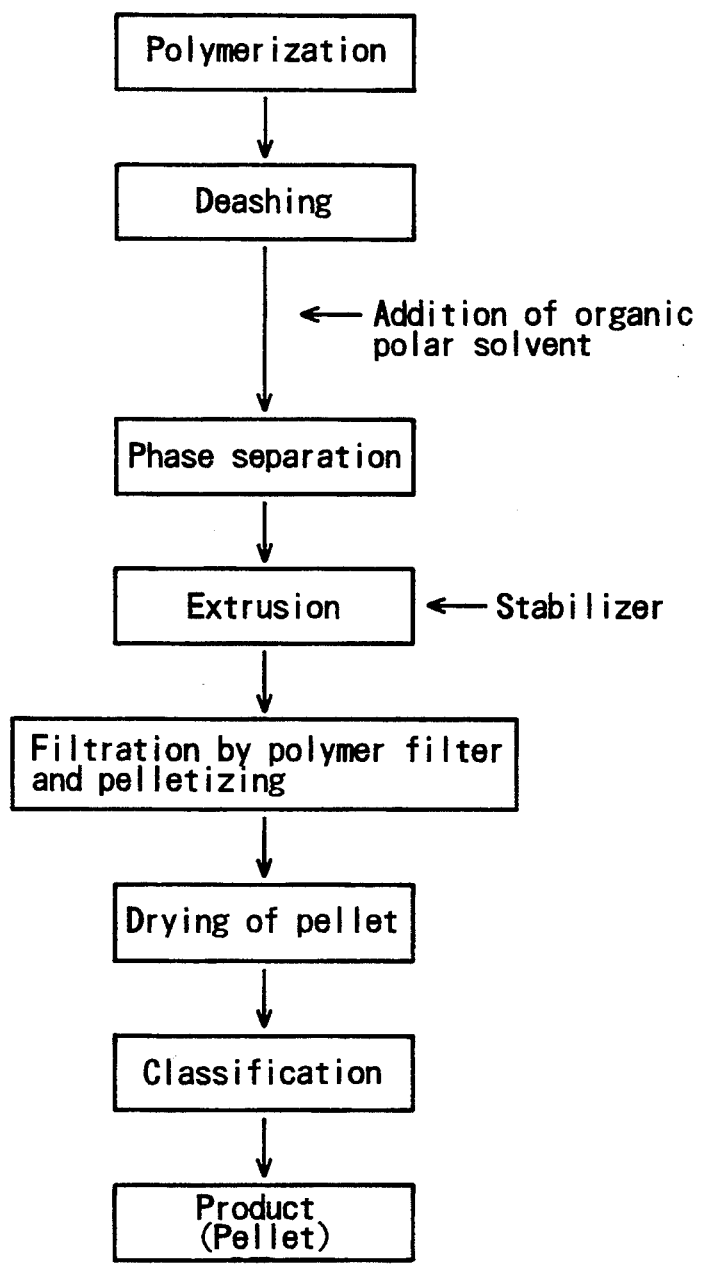
FIG. 1 shows an example of the process for preparing copolymer pellets according to the present invention.

An example of the process for preparing cycloolefin random copolymer pellets according to the invention is shown in FIG. 1.

In the process for preparing cycloolefin random copolymer pellets according to the invention, a cycloolefin random copolymer is first prepared. The cycloolefin random copolymer prepared in this; step includes a copolymer [A] of cycloolefins represented by the following formula (I) or (II) and ethylene; a copolymer [B] of the above cycloolefins and ethylene, said copolymer [B] having an intrinsic viscosity [η] of 0.05 to 10 dl/g and a softening temperature (TMA) of not lower than 70° C.; a copolymer [C] of the above cycloolefins, ethylene and at least one α-olefin other than ethylene, said copolymer [C] having an intrinsic viscosity [η] of 0.01 to 10 dl/g and a softening temperature (TMA) of lower than 70° C.; and a copolymer [D] of the above cycloolefin, ethylene and propylene or 1-butene, said copolymer [D] having an intrinsic viscosity [η] of 0.01 to 10 dl/g and a softening temperature (TMA) of not lower than 70° C.

The cycloolefin used in the invention is represented by the following formula (I) or (II).

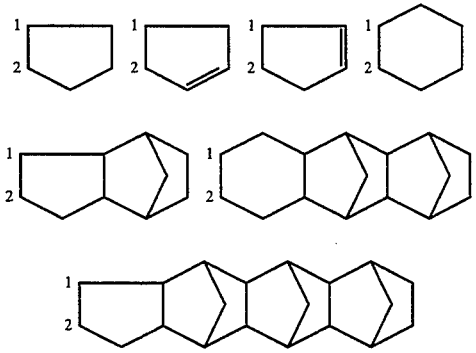

In the formula (I), n is 0 or 1, m is 0 or a positive integer, and q is 0 or 1. When q is 1, a ring represented by using q is a 6-membered ring, and when q is 0, this ring is a 5-membered ring.

Further, in the above formula (I), $R^1$–$R^{18}$, $R^a$ and $R^b$ are each independently a hydrogen atom, a halogen atom or a hydrocarbon group.

Examples of the halogen atom include fluorine atom, chlorine atom, bromine atom and iodine atom.

Examples of the hydrocarbon group generally include alkyl group of 1–20 carbon atoms, cycloalkyl group of 3–15 carbon atoms and aromatic hydrocarbon group.

Specific examples of the alkyl group include methyl group, ethyl group, propyl group, isopropyl group, amyl group, hexyl group, octyl group, decyl group, dodecyl group and octadecyl group. These alkyl groups may be substituted with halogen atoms.

A specific example of the cycloalkyl group is cyclohexyl group.

Specific examples of the aromatic hydrocarbon group include phenyl group and naphthyl group.

Moreover, in the above formula (I), $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may be linked together (or cooperate with each other) to form a monocyclic or polycyclic group, and thus formed monocyclic or polycyclic group may have a double bond.

Examples of the monocyclic or polycyclic group are given below.

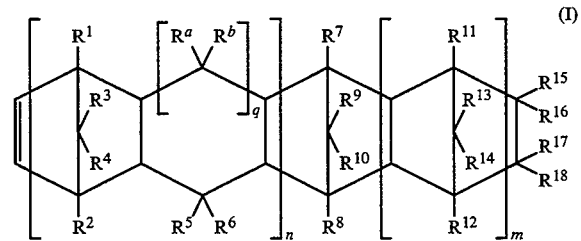

In these cyclic groups, carbon atoms attached with numerals 1 and 2 are those to which substituent $R^{15}$ ($R^{16}$) or $R^{18}$ ($R^{19}$) is linked.

In the above formula (I), $R^{15}$ and $R^{16}$, or $R^{17}$ and $R^{18}$ may together form an alkylidene group. This alkylidene group generally has 2–20 carbon atoms, and examples of such alkylidene group include ethylidene group, propylidene group and isopropylidene group.

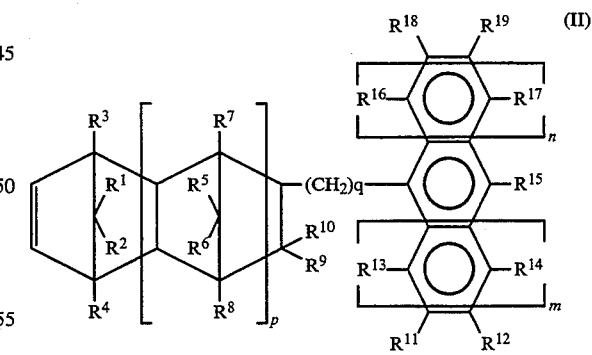

In the formula (II), each of p and q is independently 0 or an integer of 1 or more, and each of m and n is independently 0, 1 or 2.

Further, $R^1$–$R^{19}$ are each independently a hydrogen atom, a halogen atom, a hydrocarbon group or an alkoxy group.

In the formula (II), the halogen atom has the same meaning as that in the formula (I).

The hydrocarbon groups include generally alkyl group of 1–20 carbon atoms and cycloalkyl group of 3–15 carbon atoms or aromatic hydrocarbon group.

Specific examples of the alkyl group include methyl group, ethyl group, propyl group, isopropyl group, amyl group, hexyl group, octyl group, decyl group, dodecyl group and octadecyl group. These alkyl groups may be substituted with halogen atoms.

The cycloalkyl groups include, for example, cyclohexyl group.

The aromatic hydrocarbon groups include, for example, aryl group and aralkyl group. Specific examples include phenyl group, tolyl group, naphthyl group, benzyl group and phenylethyl group.

Specific examples of the alkoxy group include methoxy group, ethoxy group and propoxy group.

The carbon atom to which $R^9$ and $R^{10}$ are linked may be bonded directly or by way of an alkylene group of 1–3 carbon atoms to the carbon atom to which $R^{13}$ is linked or the carbon atom to which $R^{11}$ is linked. In the latter case, $R^9$ and $R^{13}$, or $R^{10}$ and $R^{11}$ together form alkylene group such as methylene group (—CH$_2$—), ethylene group (—CH$_2$CH$_2$—) or propylene group (—CH$_2$CH$_2$CH$_2$—).

Furthermore, in the case of n=m=0, $R^{15}$ and $R^{12}$, or $R^{15}$ and $R^{19}$ may be linked together to form a monocyclic or polycyclic aromatic ring. Examples of the aromatic ring which is formed with $R^{15}$ and $R^{12}$ in the case of n=m=0, include

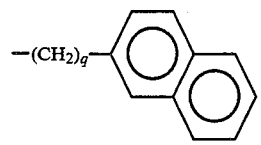

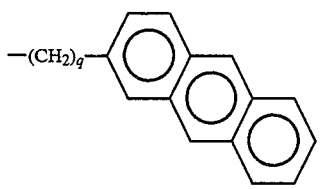

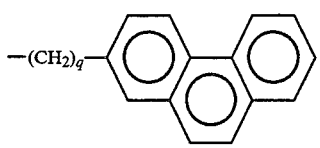

wherein q is the same as defined in the formula (II).

Cycloolefins represented by the above-mentioned formula (I) or (II) include
bicyclo-2-heptene derivatives (bicyclohept-2-ene derivatives),
tricyclo-3-decene derivatives,
tricyclo-3-undecene derivatives,
tetracyclo-3-dodecene derivatives,
pentacyclo-4-pentadecene derivatives,
pentacyclopentadecadienene derivatives,
pentacyclo-3-pentadencene derivatives,
pentaccylo-3-hexadecene derivatives,
pentacyclo-4-hexadecene derivatives,
pentacyclo-4-heptadecene derivatives,
heptacyclo-5-eicocene derivatives,
heptacyclo-4-eicocene derivatives,
heptacyclo-5-heneicocene derivatives,
octacyclo-5-dococene derivatives,
nonacyclo-5-pentacosene derivatives,
nonacyclo-6-hexacosene derivatives,
cyclopentadiene-acenaphthylene adducts,
1,4-methano-1,4,4a,9a-tetrahydrofluorene derivatives and
1,4-methano-1,4,4a,5,10,10a-hexahydroanthoracene derivatives.

Examples of the cycloolefins represented by the formula (I) or (II) are as follows:

The bicyclo[2.2.1]hept-2-ene derivatives such as

Bicyclo[2.2.1]hept-2-ene

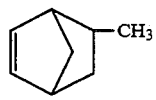

6-Methylbicyclo[2.2.1]hept-2-ene

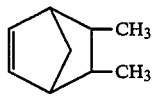

5,6-Dimethylbicyclo[2.2.1]-hept-2-ene

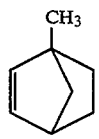

1-Methylbicyclo[2.2.1]hept-2-ene

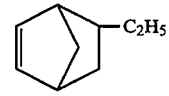

6-Ethylbicyclo[2.2.1]hept-2-ene

6-n-Butylbicyclo[2.2.1]hept-2-ene

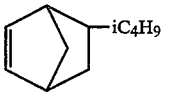

6-Isobutylbicyclo[2.2.1]hept-2-ene

7-Methylbicyclo[2.2.1]hept-2-ene;

the tricyclo[4.3.0.1$^{2,5}$]-3-decene derivatives such as

Tricyclo[4.3.0.1$^{2,5}$]-3-decene,

-continued

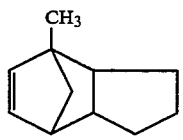
2-Methyltricyclo[4.3.0.1$^{2,5}$]-3-decene

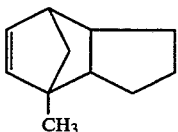
5-Methyltricyclo[4.3.0.1$^{2,5}$]-3-decene;

the tricyclo[4.4.0.1$^{2,5}$]-3-undecene derivatives such as

Tricyclo[4.4.0.1$^{2,5}$]-3-undecene

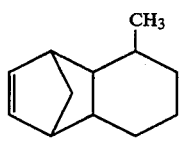
10-Methyltricyclo[4.4.0.1$^{2,5}$]-3-undecene;

the tetracyclo[4.4.0.1$^{2,5}$.1$^{7,10}$]-3-dodecene derivatives such as

Tetracyclo[4.4.0.1$^{2,5}$.1$^{7,10}$]-3-dodecene,

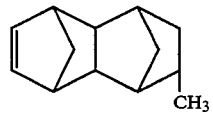
8-Methyltetracyclo[4.4.0.1$^{2,5}$.1$^{7,10}$]-3-dodecene

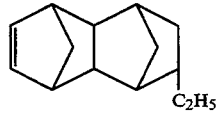
8-Ethyltetracyclo[4.4.0.1$^{2,5}$.1$^{7,10}$]-3-dodecene

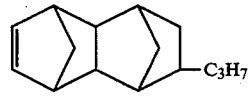
8-Propyltetracyclo[4.4.0.1$^{2,5}$.1$^{7,10}$]-3-dodecene

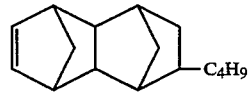
8-Butyltetracyclo[4.4.0.1$^{2,5}$.1$^{7,10}$]-3-dodecene

-continued

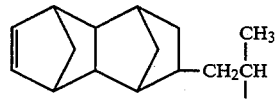
8-Isobutyltetracyclo-[4.4.0.1$^{2,5}$.1$^{7,10}$]-3-dodecene

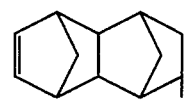
8-Hexyltetracyclo[4.4.0.1$^{2,5}$.1$^{7,10}$]-3-dodecene

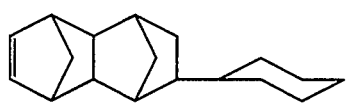
8-Cyclohexyltetracyclo-[4.4.0.1$^{2,5}$.1$^{7,10}$]-3-dodecene

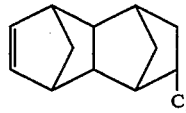
8-Stearyltetracyclo-[4.4.0.1$^{2,5}$.1$^{7,10}$]-3-dodecene

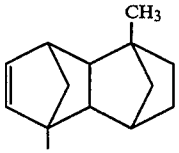
5,10-Dimethyltetracyclo-[4.4.0.1$^{2,5}$.1$^{7,10}$]-3-dodecene

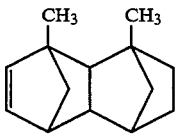
2,10-Dimethyltetracyclo-[4.4.0.1$^{2,5}$.1$^{7,10}$]-3-dodecene

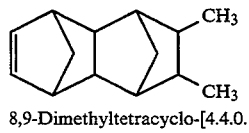
8,9-Dimethyltetracyclo-[4.4.0.1$^{2,5}$.1$^{7,10}$]-3-dodecene

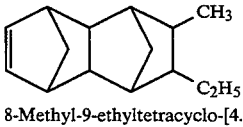
8-Methyl-9-ethyltetracyclo-[4.4.0.1$^{2,5}$.1$^{7,10}$]-3-dodecene

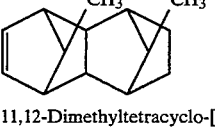
11,12-Dimethyltetracyclo-[4.4.0.1$^{2,5}$.1$^{7,10}$]-3-dodecene

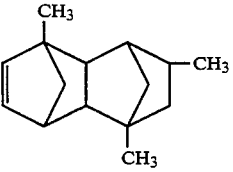
2,7,9-Trimethyltetracyclo-[4.4.0.1$^{2,5}$.1$^{7,10}$]-3-dodecene

-continued

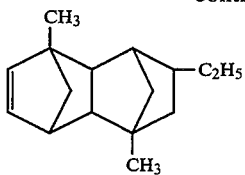
9-Ethyl-2,7-dimethyltetracyclo-[4.4.0.1$^{2,5}$.1$^{7,10}$]-3-dodecene

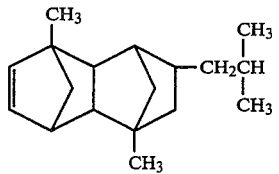
9-Isobutyl-2,7-dimethyltetracyclo-[4.4.0.1$^{2,5}$.1$^{7,10}$]-3-dodecene

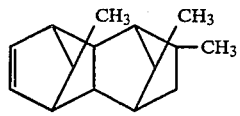
9,11,12-Trimethyltetracyclo-[4.4.0.1$^{2,5}$.1$^{7,10}$]-3-dodecene

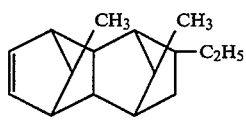
9-Ethyl-11,12-dimethyltetracyclo-[4.4.0.1$^{2,5}$.1$^{7,10}$]-3-dodecene

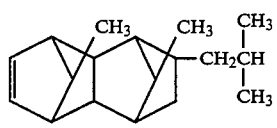
9-Isobutyl-11,12-dimethyltetracyclo-[4.4.0.1$^{2,5}$.1$^{7,10}$]-3-dodecene

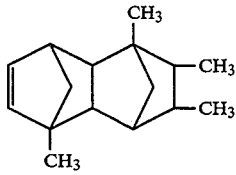
5,8,9,10-Tetramethyltetracyclo-[4.4.0.1$^{2,5}$.1$^{7,10}$]-3-dodecene

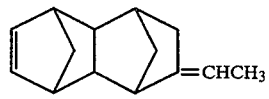
8-Ethylidenetetracyclo-[4.4.0.1$^{2,5}$.1$^{7,10}$]-3-dodecene

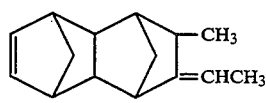
8-Ethylidene-9-methyltetracyclo-[4,4,0,1$^{2,5}$,1$^{7,10}$]-3-dodecene

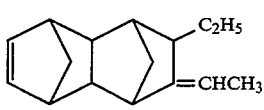
8-Ethylidene-9-ethyltetracyclo-[4.4.0.1$^{2,5}$.1$^{7,10}$]-3-dodecene

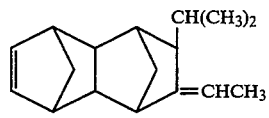
8-Ethylidene-9-isopropyltetracyclo-[4.4.0.1$^{2,5}$.1$^{7,10}$]-3-dodecene

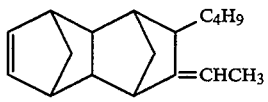
8-Ethylidene-9-butyltetracyclo-[4.4.0.1$^{2,5}$.1$^{7,10}$]-3-dodecene

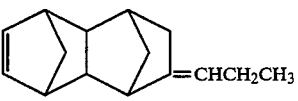
8-n-Propylidenetetracyclo-[4.4.0.1$^{2,5}$.1$^{7,10}$]-3-dodecene

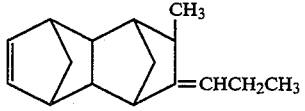
8-n-Propylidene-9-methyltetracyclo-[4.4.0.1$^{2,5}$.1$^{7,10}$]-3-dodecene

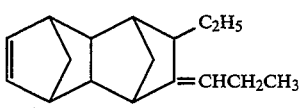
8-n-Propylidene-9-ethyltetracyclo-[4.4.0.1$^{2,5}$.1$^{7,10}$]-3-dodecene

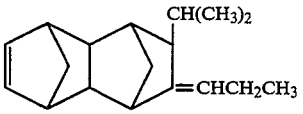
8-n-Propylidene-9-isopropyltetracyclo[4.4.0.1$^{2,5}$.1$^{7,10}$]-3-dodecene

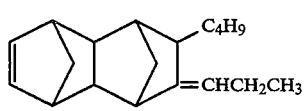
8-n-Propylidene-9-butyltetracyclo-[4.4.0.1$^{2,5}$.1$^{7,10}$]-3-dodecene

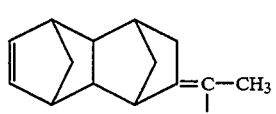
8-Isopropylidenetetracyclo-[4.4.0.1$^{2,5}$.1$^{7,10}$]-3-dodecene

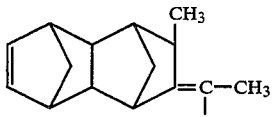
8-Isopropylidene-9-methyltetracyclo-[4.4.0.1$^{2,5}$.1$^{7,10}$]-3-dodecene

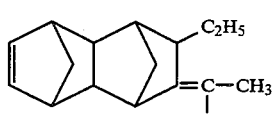
8-Isopropylidene-9-ethyltetracyclo-[4.4.0.1$^{2,5}$.1$^{7,10}$]-3-dodecene

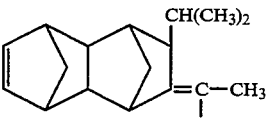
8-Isopropylidene-9-isopropyltetracyclo[4.4.0.1$^{2,5}$.1$^{7,10}$]-3-dodecene -continued

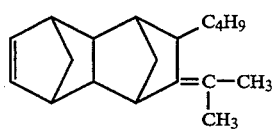
8-Isopropylidene-9-butyltetracyclo-[4.4.0.1$^{2,5}$.1$^{7,10}$]-3-dodecene;

8-Chlorotetracyclo[4.4.0.1$^{2,5}$.1$^{7,10}$]-3-dodecene

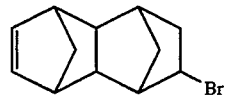
8-Bromotetracyclo[4.4.0.1$^{2,5}$.1$^{7,10}$]-3-dodecene

8-Fluorotetracyclo[4.4.0.1$^{2,5}$.1$^{7,10}$]-3-dodecene

8,9 Dichlorotetracyclo-[4.4.0.1$^{2,5}$.1$^{7,10}$]-3-dodecene the pentacyclo[6.5.1.1$^{3,6}$.0$^{2,7}$.0$^{9,13}$]-4-pentadecene derivatives such as

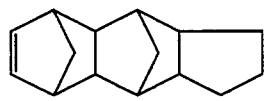
Pentacyclo[6.5.1.1$^{3,6}$.0$^{2,7}$.0$^{9,13}$]-4-pentadecene

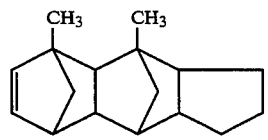
1,3-Dimethylpentacyclo-[6.5.1.1$^{3,6}$.0$^{2,7}$.0$^{9,13}$]-4-pentadecene

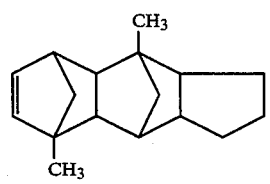
1,6-Dimethylpentacyclo-[6.5.1.1$^{3,6}$.0$^{2,7}$.0$^{9,13}$]-4-pentadecene

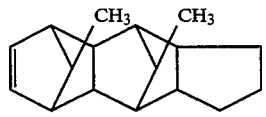
14,15-Dimethylpentacyclo[6.5.1.1$^{3,6}$.0$^{2,7}$.0$^{9,13}$]-4-pentadecene;

the pentacyclo[7.4.0.1$^{2,5}$.1$^{9,12}$.0$^{8,13}$]-3-pentadecene derivatives such as

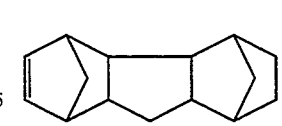
Pentacyclo [7.4.0.1$^{2,5}$.1$^{9,12}$.0$^{8,13}$]-3-pentadecene

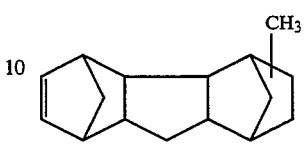
Methyl-substituted pentacyclo [7.4.0.1$^{2,5}$.1$^{9,12}$.0$^{8,13}$]-3-pentadecene;

the pentacyclopentadecadiene compounds such as

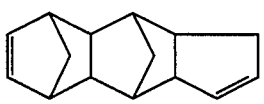
Pentacyclo[6.5.1.1$^{3,6}$.0$^{2,7}$.0$^{9,13}$]-4,10-pentadecadiene;

the pentacyclo[8.4.0.$^{2,5}$.1$^{9,12}$.0$^{8,13}$]-3-hexadecene derivatives such as

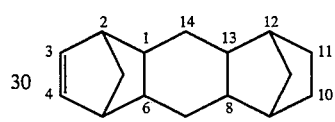
Pentacyclo [8.4.0.1$^{2,5}$.1$^{9,12}$.0$^{8,13}$]-3-hexadecene

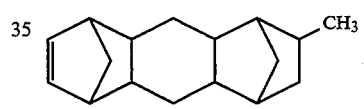
11-Methylpentacyclo [8.4.0.1$^{2,5}$.1$^{9,12}$.0$^{8,13}$]-3-hexadecene

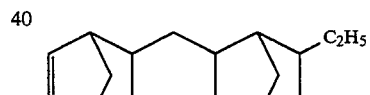
11-Ethylpentacyclo [8.4.0.1$^{2,5}$.1$^{9,12}$.0$^{8,13}$]-3-hexadecene

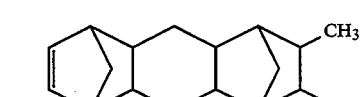
10,11-Dimethylpentacyclo [8.4.0.1$^{2,5}$.1$^{9,12}$.0$^{8,13}$]-3-hexadecene;

the pentacyclo[6.6.1.1$^{3,6}$.0$^{2,7}$.0$^{9,14}$]-4-hexadecene derivatives such as

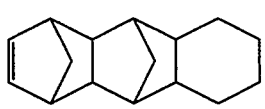
Pentacyclo [6,6,1,1$^{3.6}$,0$^{2.7}$,0$^{9,14}$]-4-hexadecene

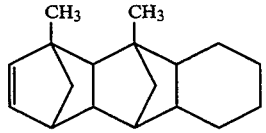
1,3-Dimethylpentacyclo-[6,6,1,1$^{3.6}$,0$^{2.7}$,0$^{9.14}$]-4-hexadecene

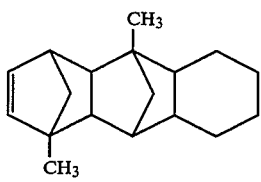

1,6-Dimethylpentacyclo-[6,6,1,1$^{3,6}$,0$^{2,7}$,0$^{9,14}$]-4-hexadecene

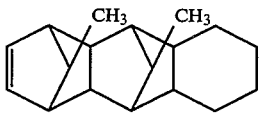

15,16-Dimethylpentacyclo-[6,6,1,1$^{3,6}$,0$^{2,7}$,0$^{9,14}$]-4-hexadecene;

the hexacyclo[6.6.1.1$^{3,6}$.1$^{10,13}$.0$^{2,7}$.0$^{9,14}$]-4-heptadecene derivatives such as

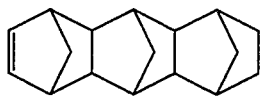

Hexacyclo [6.6.1.1$^{3,6}$.1$^{10,13}$.0$^{2,7}$.0$^{9,14}$]-4-heptadecene

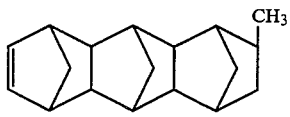

12-Methylhexacyclo [6.6.1.1$^{3,6}$.1$^{10,13}$.0$^{2,7}$.0$^{9,14}$]-4-heptadecene

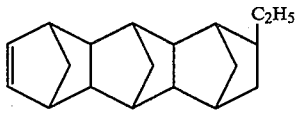

12-Ethylhexacyclo [6.6.1.1$^{3,6}$.1$^{10,13}$.0$^{2,7}$.0$^{9,14}$]-4-heptadecene

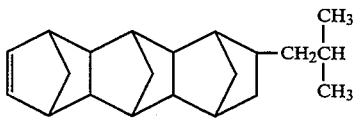

12-Isobutylhexacyclo [6.6.1.1$^{3,6}$.1$^{10,13}$.0$^{2,7}$.0$^{9,14}$]-4-heptadecene

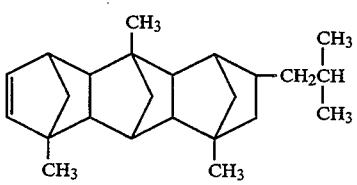

1,6,10-Trimethyl-12-isobutylhexacyclo [6.6.1.1$^{3,6}$.1$^{10,13}$.0$^{2,7}$.0$^{9,14}$]-4-heptadecene;

the heptacyclo-5-eicosene derivatives such as

Heptacyclo[8.7.0.1$^{2,9}$.1$^{4,7}$.1$^{11,17}$.0$^{3,8}$.0$^{12,16}$]-5-eicosene;

the heptacyclo[8.7.0.1$^{3,6}$.1$^{10,17}$.1$^{12,15}$.0$^{2,7}$.0$^{11,16}$]-4-eicosebe derivatives such as

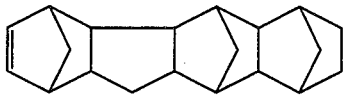

Heptacyclo[8.7.0.1$^{3,6}$.1$^{10,17}$.1$^{12,15}$.0$^{2,7}$.0$^{11,16}$]-4-eicosene

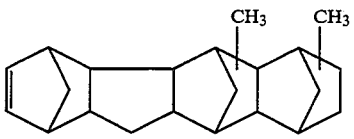

Demethyl-substituted heptacyclo-[8.7.0.1$^{3,6}$.1$^{10,17}$.1$^{12,15}$.0$^{2,7}$.0$^{11,16}$]-4-eicosene;

the heptacyclo[8.8.0.1$^{4,7}$.1$^{11,18}$.1$^{13,16}$.0$^{3,8}$.0$^{12,17}$]-5-heneicosene derivatives such as

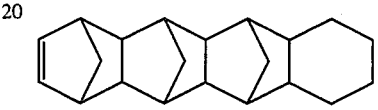

Heptacyclo[8.8.0.1$^{2,9}$.1$^{4,7}$.1$^{11,18}$.0$^{3,8}$.0$^{12,17}$]-5-heneicosene

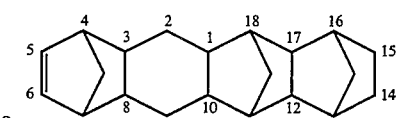

Heptacyclo [8.8.0.1$^{4,7}$.1$^{11,18}$.1$^{13,16}$.0$^{3,8}$.0$^{12,17}$]-5-heneicosene

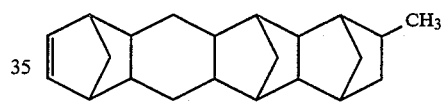

15-Methylheptacyclo[8.8.0.1$^{4,7}$.1$^{11,18}$.1$^{13,16}$.0$^{3,8}$.0$^{12,17}$]-5-heneicosene

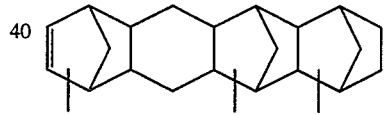

Trimethyl-substituted-heptacyclo [8.8.0.1$^{4,7}$.1$^{11,18}$.1$^{13,16}$.0$^{3,8}$.0$^{12,17}$]-5-heneicosene;

the octacyclo[8.8.0.1$^{2,9}$.1$^{4,7}$.1$^{11,18}$.1$^{13,16}$.0$^{3,8}$.0$^{12,17}$]-5-docosene derivatives such as

Octacyclo [8.8.0.1$^{2,9}$.1$^{4,7}$.1$^{11,18}$.1$^{13,16}$.0$^{3,8}$.0$^{12,17}$]-5-docosene

15-Methyloctacyclo [8.8.0.1$^{2,9}$.1$^{4,7}$.1$^{11,18}$.1$^{13,16}$.0$^{3,8}$.0$^{12,17}$]-5-docosene

15-Ethyloctacyclo [8.8.0.1$^{2,9}$.1$^{4,7}$.1$^{11,18}$.1$^{13,16}$.0$^{3,8}$.0$^{12,17}$]-5-docosene;

the nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene derivatives such as

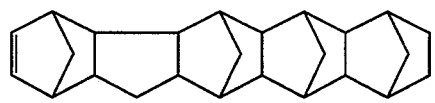

Nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene

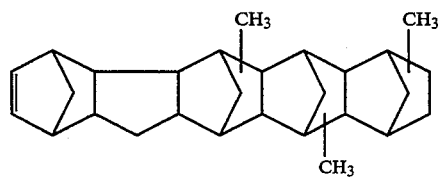

Trimethyl-substituted-nonacyclo-[10.9.1.1$^{4,7}$.1$^{13,20}$.1$^{15,18}$.0$^{2,10}$.0$^{3,8}$.0$^{12,21}$.0$^{14,19}$]-5-pentacosene the nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as

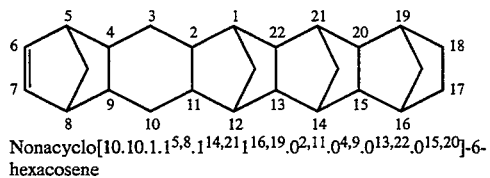

Nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene and furthermore,

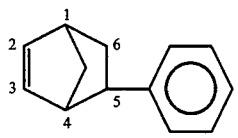

5-Phenyl-bicyclo[2.2.1]hept-2-ene

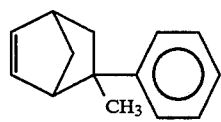

5-Methyl-5-phenyl-bicyclo[2.2.1]-hept-2-ene

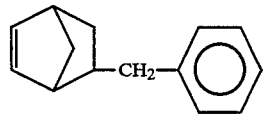

5-Benzyl-bicyclo[2.2.1]hept-2-ene

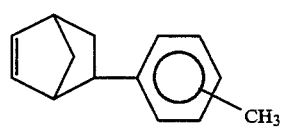

5-Tolyl-bicyclo[2.2.1]hept-2-ene

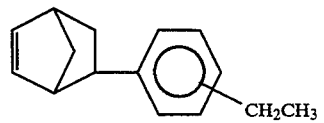

5-(Ethylphenyl)-bicyclo[2.2.1]hept-2-ene

-continued

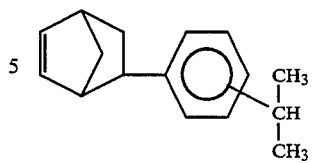

5-(Isopropylphenyl)-bicyclo[2.2.1]-hept-2-ene

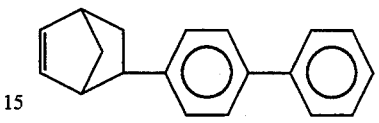

5-(Biphenyl)-bicyclo[2.2.1]hept-2-ene

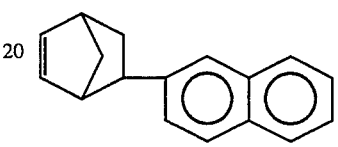

5-(β-Naphthyl)-bicyclo[2.2.1]hept-2-ene

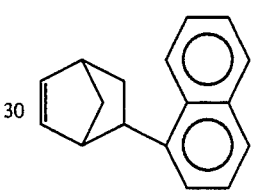

5-(α-Naphthyl)-bicyclo[2.2.1]hept-2-ene

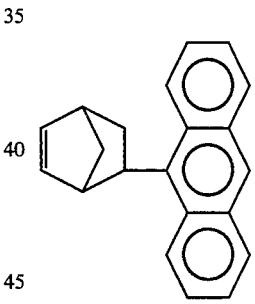

5-(Anthracenyl)-bicyclo[2.2.1]hept-2-ene

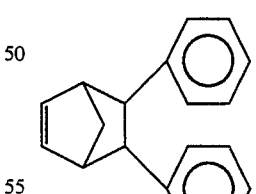

5,6-Diphenyl-bicyclo[2.2.1]hept-2-ene

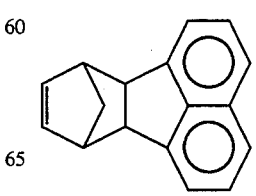

Cyclopentadiene-acenaphthylene adducts

-continued

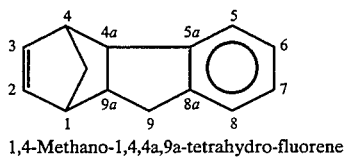

1,4-Methano-1,4,4a,9a-tetrahydro-fluorene

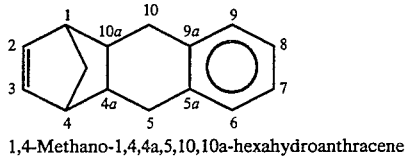

1,4-Methano-1,4,4a,5,10,10a-hexahydroanthracene

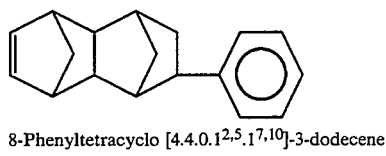

8-Phenyltetracyclo [4.4.0.1$^{2,5}$.1$^{7,10}$]-3-dodecene

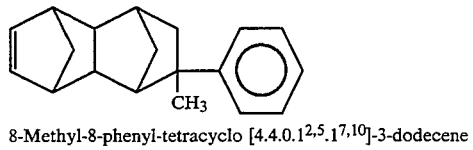

8-Methyl-8-phenyl-tetracyclo [4.4.0.1$^{2,5}$.1$^{7,10}$]-3-dodecene

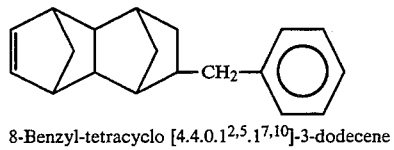

8-Benzyl-tetracyclo [4.4.0.1$^{2,5}$.1$^{7,10}$]-3-dodecene

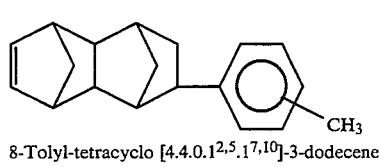

8-Tolyl-tetracyclo [4.4.0.1$^{2,5}$.1$^{7,10}$]-3-dodecene

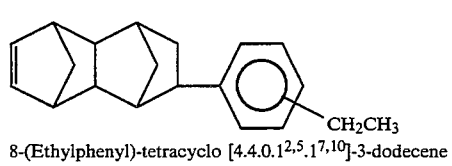

8-(Ethylphenyl)-tetracyclo [4.4.0.1$^{2,5}$.1$^{7,10}$]-3-dodecene

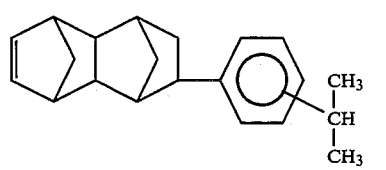

8-(Isopropylphenyl)tetracyclo[4.4.0.1$^{2,5}$.1$^{7,10}$]-3-dodecene

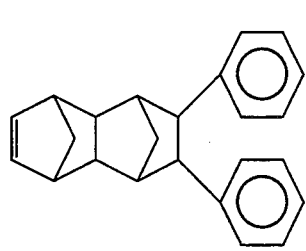

8,9-Diphenyl-tetracyclo [4.4.0.1$^{2,5}$.1$^{7,10}$]-3-dodecene

-continued

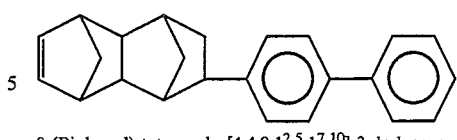

8-(Biphenyl)-tetracyclo [4.4.0.1$^{2,5}$.1$^{7,10}$]-3-dodecene

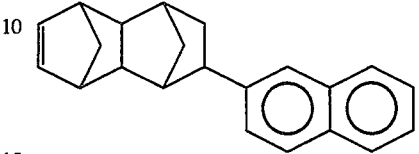

8-($\beta$-Naphthyl)-tetracyclo [4.4.0.1$^{2,5}$.1$^{7,10}$]-3-dodecene

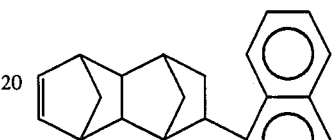

8-($\alpha$-Naphthyl)-tetracyclo [4.4.0.1$^{2,5}$.1$^{7,10}$]-3-dodecene

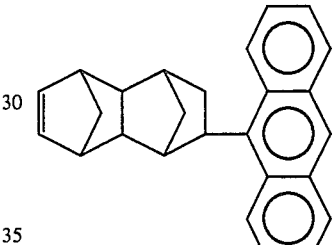

8-(Anthracenyl)-tetracyclo [4.4.0.1$^{2,5}$.1$^{7,10}$]-3-dodecene

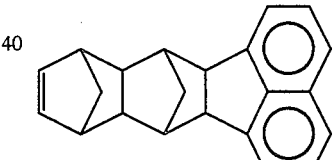

Compound of cyclopentadiene-acenaphthylene adducts with cyclopentadiene further added

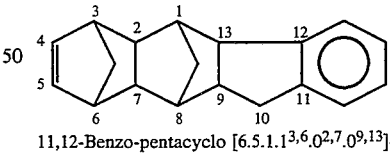

11,12-Benzo-pentacyclo [6.5.1.1$^{3,6}$.0$^{2,7}$.0$^{9,13}$]-4-pentadecene

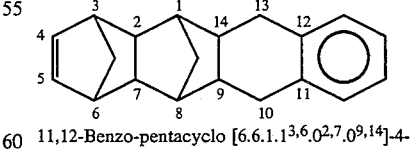

11,12-Benzo-pentacyclo [6.6.1.1$^{3,6}$.0$^{2,7}$.0$^{9,14}$]-4-hexadecene

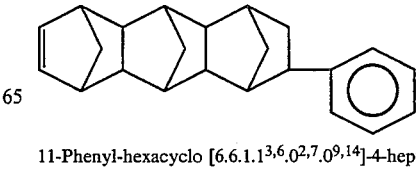

11-Phenyl-hexacyclo [6.6.1.1$^{3,6}$.0$^{2,7}$.0$^{9,14}$]-4-heptadecene

-continued

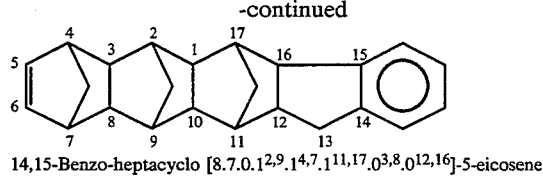

14,15-Benzo-heptacyclo [8.7.0.1$^{2,9}$.1$^{4,7}$.1$^{11,17}$.0$^{3,8}$.0$^{12,16}$]-5-eicosene The cycloolefin random copolymer can be prepared by, for example, polymerizing ethylene and the cycloolefin (I) or (II) and, if necessary, other α-olefin such as propylene or 1-butene, in a hydrocarbon medium (solvent) or the cycloolefin in the presence of a catalyst (a) formed from a hydrocarbon-soluble vanadium compound and a halogen-containing organoaluminum compound or a catalyst (b) formed from a compound of the Group IV transition metal containing a ligand having a pentadienyl skeleton or a lanthanoid compound and an organoaluminum oxy-compound, and if necessary, an organoaluminum compound.

More specifically, for example, in a continuous polymerization apparatus, ethylene is copolymerized with tetracyclo[4.4.0.1$^{2,5}$.1$^{7,10}$]-3-dodecene (hereinafter sometimes abbreviated to "TCD-3") as the cycloolefin in a cyclohexane medium using VO(OCH$_2$CH$_3$)Cl$_2$/Al(CH$_2$CH$_3$)$_{1.5}$Cl$_{1.5}$ as a catalyst under the conditions of a reaction temperature of 10° C. and a reaction time (residence time for polymerization reaction) of 30 minutes, to prepare an ethylene/TCD-3 random copolymer.

The hydrocarbon solvent employable herein is, for example, a non-polar solvent having 5 to 12 carbon atoms, such as cyclohexane. Also employable as the reaction medium is a compound which is used as a starting material and is liquid at an operating temperature, such as cycloolefin. Such compound can be used singly or in combination with the above-mentioned non-polar solvent.

The cycloolefin random copolymer, which is a copolymer of the above-described cycloolefin and ethylene, contains recurring units derived from ethylene and recurring units derived from the cycloolefin as its essential constituent units. In addition, the copolymer may contain recurring units derived from other monomers copolymerizable with ethylene and the above-mentioned cycloolefin, with the proviso that the properties of the aimed copolymer can be ensured.

The other monomers include olefins other than ethylene and the above-mentioned cycloolefins. Examples are α-olefins of 3–20 carbon atoms such as propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethy-1-pentene, 4-ethyl-1-hexene, 3-ethyl-1-hexene, 1-octene, 1-decene, 1-dodecene, 1-tetradecene, 1-hexadecene, 1-octadecene and 1-eicocene;

cycloolefins such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4 and 7-methano-1H-indene;

norbornenes such as 2-norbornene, 5-methyl-2-norbornene, 5-ethyl-2-norbornene, 5-isopropyl-2-norbornene, 5-n-butyl-2-norbornene, 5-isobutyl-2-norbornene, 5,6-dimethyl-2-norbornene, 5-chloro-2-norbornene and 5-fluoro-2-norbornene;

non-conjugated dienes such as 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene.

These monomers can be used singly or in combination of two or more kinds.

In the cycloolefin random copolymer, the recurring units derived from such monomers as described above are contained in an amount of usually not more than 20% by mol, preferably not more than 10% by mol.

A variety of polymerization processes for preparing cycloolefin random copolymers and catalysts used therefor have been already known, and the above-mentioned copolymer can be prepared under the appropriately selected conditions in accordance with the processes proposed by the present applicant as described in, for example, Japanese Patent Laid-Open Publications No. 168708/1985, No. 120826/1986, No. 115912/1986 and No. 115916/1986, Japanese Patent Applications No. 95905/1986 and No. 95906/1986, and Japanese Patent Laid-Open Publications No. 271308/1986 and No. 272216/1986.

In such cycloolefin random copolymers, the cycloolefin represented by the formula (I) or (II) is considered to form recurring units represented by the following formula (III) or (IV):

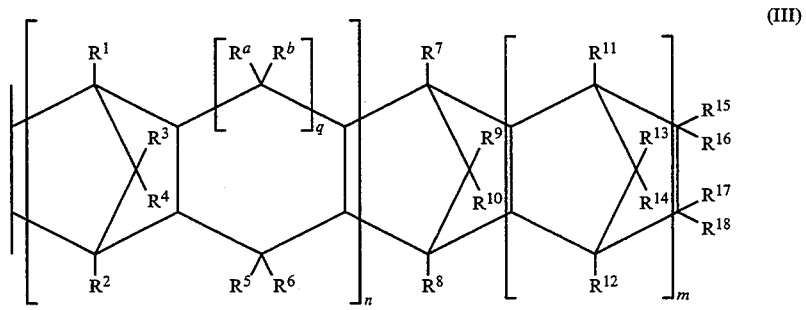

(III)

wherein m, n, q, $R^1$–$R^{18}$, $R^a$ and $R^b$ are each as defined in the formula (I); or

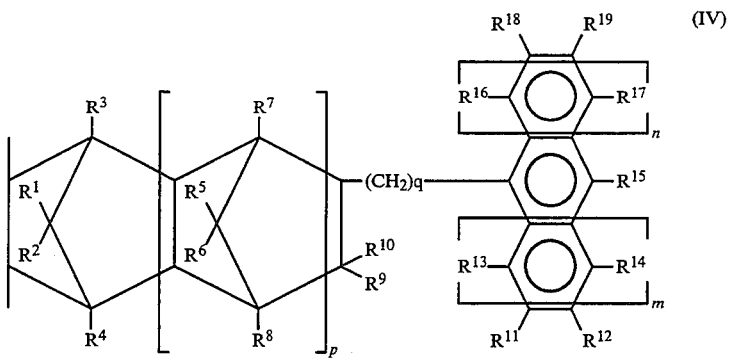

wherein m, n, p, q and $R^1$–$R^{19}$ are each as defined in the formula (II).

In the cycloolefin random copolymer as mentioned above recurring units derived from ethylene exist in the range generally of 40 to 90 mol % preferably 50 to 85 mol % recurring units derived from the cycloolefin exist in the range generally from 10 to 60 mol %, preferably 15 to 50 mol %. The recurring units derived from ethylene and those derived from the cycloolefins are arranged at random and substantially linearly. A substantially linear structure of the cycloolefin random copolymer is confirmed by the fact that the copolymer dissolves completely in decahydronaphthalene at 135° C. In addition, the compositions of ethylene and the cycloolefin can be measured by $^{13}$C-NMR.

In such cycloolefin random copolymers, the intrinsic viscosity [η] of the cycloolefin random copolymer [A] used in the first invention is generally 0.01 to 5 dl/g, preferably 0.1 to 3 dl/g, as measured in decahydronaphthalene at 135° C. The softening temperature (TMA), as measured by a thermomechanical analyzer, is generally 70° C. or higher, preferably 70° to 250° C., more preferably 80° to 200° C., still more preferably 90° to 180° C. The glass transition temperature (Tg) of the cycloolefin random copolymer [A] is in the range generally of 50° to 230° C., preferably 60° to 180° C. The crystallinity, as measured by X-ray diffractiometry, is in the range of 0 to 10%, preferably 0 to 7%, especially preferably 0 to 5%.

In the first process for preparing pellets according to the invention, the cycloolefin random copolymer solution containing the cycloolefin random copolymer [A] is supplied to a deashing stage if desired, and then supplied to a phase separation stage.

The cycloolefin random copolymer [B] used in the second process for preparing pellets according to the invention can be prepared by copolymerizing ethylene and the cycloolefin represented by the formula (I) or (II) in the same hydrocarbon solvent in the presence of the same catalyst as described before in the first process for preparing pellets, usually at a temperature of −50° to 200° C. under a pressure of 0 to 50 kg/cm²-G.

This polymerization can be conducted by the use of, for example, a loop type reactor and a vessel type polymerization vessel equipped with a stirrer.

In the cycloolefin random copolymer [B] thus obtained, the recurring units derived from ethylene exist in an amount of usually 40 to 85% by mol, preferably 50 to 75% by mol, and the recurring units derived from the cycloolefin exist in an amount of usually 15 to 60% by mol, preferably 25 to 50% by mol. The recurring units derived from ethylene and the recurring units derived from the cycloolefin are arranged at random and substantially linearly. A substantially linear and free from crosslinked gel structure of the cycloolefin random copolymer [B] can be confirmed by the fact that this copolymer is perfectly dissolved in decahydronaphthalene at 135° C.

The intrinsic viscosity [η] of the cycloolefin random copolymer [B], as measured in decahydronaphthalene at 135° C., is in the range of 0.05 to 10 dl/g, preferably 0.08 to 5 dl/g.

The softening temperature (TMA) of the cycloolefin random copolymer [B], as measured by a thermomechanical analyzer, is not lower than 70° C., preferably 70° to 250° C. The glass transition temperature (Tg) of the cycloolefin random copolymer [B] is in the range of usually 50° to 230° C., preferably 70° to 210° C.

The crystallinity of the cycloolefin random copolymer [B] as measured by X-ray diffractometry, is in the range of usually 0 to 10%, preferably 0 to 7%, more preferably 0 to 5%.

The cycloolefin random copolymer [C] used in the second process for preparing pellets according to the invention can be prepared by copolymerizing ethylene, the aforementioned cycloolefin and at least one α-olefin other than ethylene in the same hydrocarbon solvent in the presence of the same catalyst under the same conditions as described in the preparation of the above copolymer [B].

The α-olefin other than ethylene may have 3 to 20 carbon atoms, and examples thereof include propylene, 1-butene, 4-methyl-1-pentene, 1-hexene, 1-octene, 1-decene, 1-dodecene, 1-tetradecene, 1-hexadecene, 1-octadecene and 1-eicosene.

Further, the cycloolefin random copolymer [C] may contain recurring units derived from at least one further monomer which is copolymerizable with ethylene, the α-olefin other than ethylene and the cycloolefin (I) or (II), provided that it does not deteriorate the properties of the aimed pellets. As these copolymerizable monomers, those exemplified for the cycloolefin random copolymer [A] can be used.

In the cycloolefin random copolymer [C] thus obtained, the recurring units derived from ethylene exist in an amount of usually 40 to 99% by mol, preferably 75 to 98% by mol; the recurring units derived from the cycloolefin exist in an amount of usually 1 to 40% by mol, preferably 1 to 15% by mol; and the recurring units derived from at least one α-olefin other than ethylene exist in an amount of usually 1 to 45% by mol, preferably 1 to 35% by mol. The recurring units derived from ethylene, the recurring units derived from the cycloolefin and the recurring units derived from other α-olefin are arranged at random and substantially linearly. A substantially linear and free from crosslinked gel structure of the cycloolefin random copolymer [C] can be confirmed by the fact that this copolymer is perfectly dissolved in decahydronaphthalene at 135° C.

The intrinsic viscosity [η] of the cycloolefin random copolymer [C] as measured in decahydronaphthalene at 135° C., is in the range of 0.01 to 10 dl/g, preferably of 0.08 to 5 dl/g.

The softening temperature (TMA) of the cycloolefin random copolymer [C], as measured by a thermomechanical analyzer, is lower than 70° C., preferably —40° to 60° C. It is desired that the softening temperature of the cycloolefin random copolymer [C] is lower than that of the cycloolefin random copolymer [B] by usually 30° to 250° C., preferably 50° to 250° C.

The glass transition temperature (Tg) of the cycloolefin random copolymer [C] is in the range of usually −60° to 40° C., preferably −50° to 10° C. It is desired that the glass transition temperature of the cycloolefin random copolymer [C] is lower than that of the cycloolefin random copolymer [B] by usually 30° to 250° C., preferably 100° to 240° C.

The crystallinity of the cycloolefin random copolymer [C], as measured by X-ray diffractometry, is in the range of usually 0 to 10%, preferably 0 to 7%, more preferably 0to5%.

In the second process for preparing pellets according to the invention, a solution containing the cycloolefin random copolymer [B] is mixed with a solution containing the cycloolefin random copolymer [C] in such a manner that the amount of the cycloolefin random copolymer [C] is in the range of 1 to 100 parts by weight, preferably 5 to 80 parts by weight, more preferably 10 to 70 parts by weight, based on 100 parts by weight of the cycloolefin random copolymer [B]. If the amount of the cycloolefin random copolymer [C] is less than 1 part by weight, a molded product formed from the resultant pellets is apt to lower in the impact resistance though it is good in the rigidity. On the other hand, if the amount thereof exceeds 100 parts by weight, the molded product is poor in the rigidity though it is good in the impact resistance. Thus, when the amount of the copolymer [C] is out of the above range, there arises a tendency of bad balance between the rigidity and the impact resistance.

In the second process for preparing pellets according to the invention, the cycloolefin random copolymer solution containing the cycloolefin random copolymers [B] and [C] is supplied to a deashing stage if desired, and then supplied to a phase separation stage.

In the third process for preparing pellets according to invention, the above-mentioned cycloolefin random copolymer [B] and the cycloolefin random copolymer [D] are employed. The cycloolefin random copolymer [D] can be prepared by copolymerizing ethylene, the aforementioned cycloolefin and propylene or 1-butene in the same hydrocarbon solvent in the presence of the same catalyst as described before in the first process for preparing pellets, usually at a temperature of −50° to 200° C. under a pressure of 0 to 50 kg/cm$^2$-G.

This polymerization can be conducted by the use of, for example, a loop type reactor and a vessel type polymerization reactor equipped with a stirrer.

In the cycloolefin random copolymer [D] thus obtained, the recurring units derived from ethylene exist in an amount of usually 40 to 99% by mol, preferably 75 to 98% by mol, and the recurring units derived from the cycloolefin exist in an amount of usually 1 to 40% by mol, preferably 1 to 15% by mol. When propylene is used as an essential component, the recurring units derived from propylene exist in an amount of usually 1 to 45% by mol, preferably 1 to 35% by mol. When 1-butene is used as an essential component in place of propylene, the recurring units derived from 1-butene exist in an amount of usually 1 to 45% by mol, preferably 1 to 35% by mol. The recurring units derived from ethylene, the recurring units derived from the cycloolefin and the recurring units derived from propylene or 1-butene are arranged at random and substantially linearly. A substantially linear and free from crosslinked gel structure of the cycloolefin random copolymer [D] can be confirmed by the fact that this copolymer is perfectly dissolved in decahydronaphthalene at 135° C.

The intrinsic viscosity [η] of the cycloolefin random copolymer [D] as measured in decahydronaphthalene at 135° C. is in the range of 0.01 to 10 dl/g, preferably 0.08 to 5 dl/g.

The softening temperature (TMA) of the cycloolefin random copolymer [D], as measured by a thermomechanical analyzer, is lower than 70° C., preferably —40° to 60° C. It is desired that the softening temperature of the cycloolefin random copolymer [D] is lower than that of the cycloolefin random copolymer [B] by usually 30 to 250° C., preferably 50° to 250° C.

The glass transition temperature (Tg) of the cycloolefin random copolymer [D] is in the range of usually −60° to 40° C., preferably −50° to 10° C. It is desired that the glass transition temperature of the cycloolefin random copolymer [D] is lower than that of the cycloolefin random copolymer [B] by usually 30° to 250° C., preferably 100° to 240° C.

The crystallinity of the cycloolefin random copolymer [D] as measured by X-ray diffractometry is in the range of usually 0 to 10%, preferably 0 to 7%, more preferably 0 to 5%.

In the third process for preparing pellets according to the invention, a solution containing the cycloolefin random copolymer [B] is mixed with a solution containing the cycloolefin random copolymer [D] in such a manner that the amount of the cycloolefin random copolymer [D] is in the range of 1 to 100 parts by weight, preferably 5 to 80 parts by weight, more preferably 10 to 70 parts by weight, based on 100 parts by weight of the cycloolefin random copolymer [B]. If the amount of the cycloolefin random copolymer [D] is less than 1 part by weight, a molded product formed from the resultant pellets is apt to lower in the impact resistance though it is good in the rigidity. On the other hand, if the amount thereof exceeds 100 parts by weight, the molded product is poor in the rigidity though it is good in the impact resistance. Thus, when the amount of the copolymer [D] is out of the above range, there arises a tendency of bad balance between the rigidity and the impact resistance.

In the third process for preparing pellets according to the invention, the cycloolefin random copolymer solution containing the cycloolefin random copolymers [B] and [D] is supplied to a deashing stage if desired, and then supplied to a phase separation stage.

The first to third processes of the invention can be conducted as described hereinafter.

For example, the reaction solution (copolymer solution) containing the cycloolefin random copolymer obtained above is supplied to a phase separation stage preferably through a deashing stage, as shown in FIG. 1.

The deashing is to remove a catalyst remaining in the copolymer solution by precipitation. That is, after the polymerization reaction is conducted as described above, the copolymer solution in which the cycloolefin random copolymer is dissolved is generally taken out of the reactor and deashed.

In this stage, to the copolymer solution taken out of the reactor are generally added hot water and a pH adjustor. The pH adjustor employable herein is, for example, an aqueous solution of sodium hydroxide having a concentration of approx. 1 to 40% by weight. By the addition of hot water and the pH adjustor, the copolymerization reaction stops and the catalyst dissolved in the copolymer solution is precipitated. In the deashing stage, the catalyst thus precipitated is removed from the copolymer solution after cooling the copolymer solution.

After the deashing stage, the solution containing the cycloolefin random copolymer is then led to a separation zone, where the copolymer solution is subjected to phase separation.

In the separation zone, to the solution containing the cycloolefin random copolymer is added an organic polar solvent.

Examples of the organic polar solvent added herein include:

ketones, such as ecetone, methyl ethyl ketone, diethyl ketone and methyl isobutyl ketone;

alcohols, such as methanol, ethanol, propanol, isopropanol, butanol, sec-butanol and tert-butanol;

esters, such as methyl acetate, ethyl acetate and propyl acetate;

ethers, such as ethyl ether and tetrahydrofuran; and halides of aliphatic, aromatic and alicyclic hydrocarbons, such as methyl chloride, ethyl chloride and chlorobenzene.

These organic polar solvents may be used singly or in combination. Of the organic polar solvents, ketones are preferably used in the invention, and of the ketones, acetone is particularly preferred.

By the addition of such organic polar solvent to the copolymer solution in which the cycloolefin random copolymer is dissolved in the hydrocarbon solvent, the copolymer solution exhibits the cloud point at the time when the amount of the organic polar solvent reaches a certain amount. In the invention, the organic polar solvent is added to the copolymer solution in an amount more than the above-mentioned certain amount by which the copolymer solution exhibits the cloud point. Further, it is preferred that the organic polar solvent is added in an amount more than the above-described one and such an amount that the cycloolefin random copolymer is not precipitated or solidified. The amount of the organic polar solvent to be added is varied depending upon nature of the copolymer (e.g., molecular weight, molecular weight distribution, composition, composition distribution), concentration of the copolymer in the solution, kind of the hydrocarbon solvent, temperature, kind of the organic polar solvent added, etc. For example, when 20 parts by volume of acetone is added at room temperature to 100 parts by volume of a cyclohexane solution containing 5% by weight of the cycloolefin random copolymer, the copolymer solution exhibits the cloud point. In the invention, it is desired that the organic polar solvent is added in an amount of usually 1 to 5 times, preferably 1.1 to 3 times, as much as the amount by which the copolymer solution exhibits the cloud point. In general, as the amount of the organic polar solvent increases, the copolymer concentration in the concentrated phase becomes higher, while the copolymer concentration in the dilute phase becomes lower. Further, with the increase of the amount of the organic polar solvent, the dilute phase tends to selectively take up the low molecular weight cycloolefin random copolymer. Moreover, as a difference in the density between the concentrated phase and the dilute phase becomes larger, the phase separation between the concentrated phase and the dilute phase can be more efficiently carried out, whereby post treatments of each phases can be readily made.

The copolymer solution added with the organic polar solvent in such an amount as described above is phase-separated into the concentrated phase containing the cycloolefin random copolymer relatively in a high concentration (generally, lower phase) and a dilute phase containing the cycloolefin random copolymer in a low concentration (upper phase).

After the addition of the organic polar solvent, the phase separation of the copolymer solution can be carried out by means of gravity sedimentation, e.g., by allowing the copolymer solution to stand, or by means of centrifugal separation, etc.

In the invention, from the copolymer solution thus phase-separated, the concentrated phase, which is in general the lower phase, is taken out.

The lower phase (concentrated phase) solution thus taken out is then preferably sent to a heating stage to conduct heating. The heating is carried out by the use of, for example, a heat exchanger such as a multi-tube type heat exchanger or a double-tube type heat exchanger. The temperature for heating the concentrated phase solution is in the range of usually 50° to 380° C., preferably 150° to 300° C. By virtue of heating the solution at such temperature, the solvents and the unreacted cycloolefin which remains in a small amount can be very easily removed in the subsequent step carried out in an extruder.

After the heating, the concentrated phase solution is fed to an extruder. In the extruder, the solvent and the unreacted cycloolefin still remaining in the solution in a small amount are removed, and the cycloolefin random copolymer produced is melted and then pelletized.

Examples of the extruder used in the invention include conventionally known extruders such as a single-screw extruder, a twin-screw one-way extruder, a twin-screw two-way extruder and a planetary screw extruder. The extruder used in the invention is provided with a means for removing the solvent and the unreacted cycloolefin, for example, a vent. In the invention, it is preferred to use a twin-screw extruder provided with a back vent and a vacuum vent. The vacuum pressure of the vacuum vent portion is adjusted to be in the range of usually atmospheric pressure to 0.1 Torr, preferably 100 to 1 Torr by means of the vacuum vent. The barrel temperature of the extruder is adjusted to be in the range of usually 180° to 380° C., preferably 210° to 350° C. Relatively large amounts of the solvent and the unreacted cycloolefin are removed by the back vent, and owing to the vacuum vent, the solvent and cycloolefin still remaining in extremely small amounts can be almost completely removed.

The cycloolefin random copolymer extruded under the above conditions is generally filtered through a polymer filter and then pelletized. It is preferred that a difference between the pressure on the front side of the polymer filter and the pressure on the back side thereof is not made excessively large.

There is no specific limitation on the shape and the size of the copolymer pellets obtained as above, and the pellets of any shape and any size can be formed.

Moisture is usually attached to the copolymer pellets obtained in the above, so that the pellets are generally dried to remove moisture. Then, the pellets can be classified so as to remove fine particles having a weight of not more than 1/10 as much as the weight of the aimed pellet, fine foreign substances, etc.

In the cycloolefin random copolymer pellets thus obtained, contents of the unreacted cycloolefin and the low molecular weight cycloolefin random copolymer are very low, and hence mold staining hardly takes place when a molded product is formed from the pellets.

Figure 2:
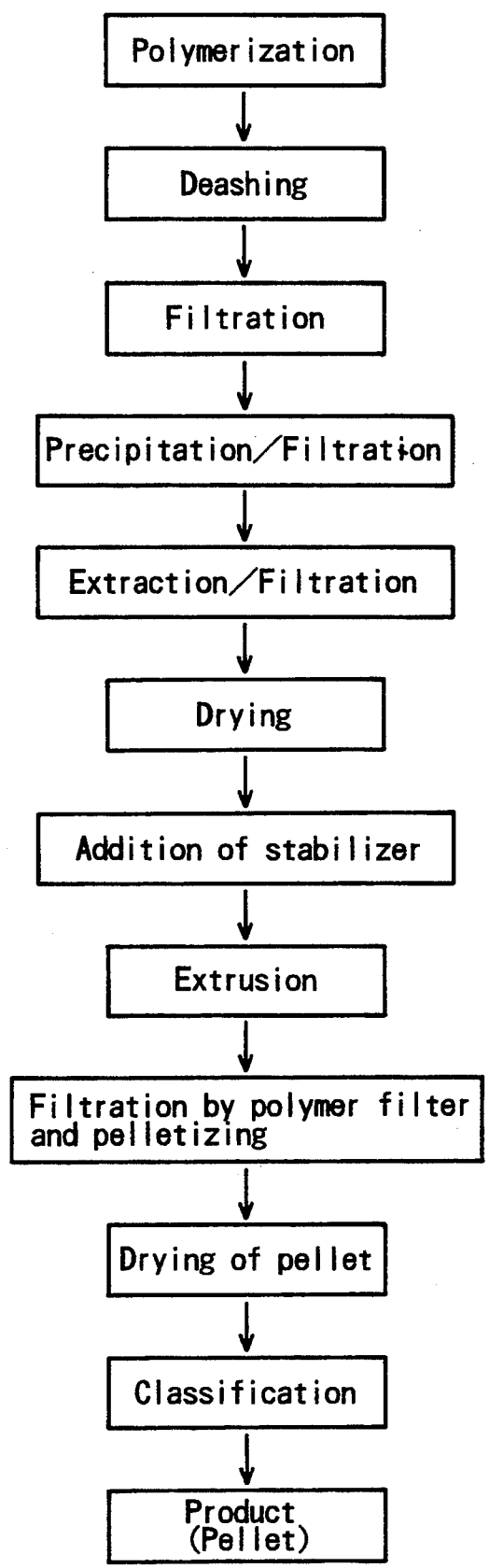
FIG. 2 shows an example of the conventional process for preparing copolymer pellets.

According to the present invention, the cycloolefin random copolymer pellets can be prepared without going through a large number of steps, which are essential in the conventional process, such as a precipitation step, a step of filtering the precipitated copolymer, a step of dispersing again the filtered copolymer in a solvent, a step of extracting the unreacted substance from the dispersion, a step of filtering the dispersion, and a step of drying the filtered dispersion. Hence, the cost for preparing the pellets can be reduced. According to the invention, moreover, the cycloolefin random copolymer in the form of a liquid mixture is fed to the extruder, and thereby shear stress applied to the copolymer can be more reduced as compared with the conventional process shown in FIG. 2. As a result, there can be inhibited formation of by-products (e.g., cyclohexane-insoluble fine particles having a diameter of not less than 1 $\mu$m), which cause lowering of the transparency of a molded product prepared from the resultant pellets, accompanied by the preparation of the cycloolefin random copolymer.

The cycloolefin random copolymer pellets prepared by the process of the invention can be used, for example, in a field of optical materials such as optical disc substrates and optical fibers and a field of transparent container materials and packaging materials such as transparent films and transparent containers. Moreover, according to the process of the invention, the copolymer in the form of a liquid mixture is fed to the extruder, and thereby formation of by-products (e.g., cyclohexane-insoluble fine particles having a diameter of not less than 1 $\mu$m) of the cycloolefin random copolymer occurs at a lower level as compared with the conventional process shown in FIG. 2. Hence, the process of the invention is very suitable for preparing molding materials for forming optical disc substrates almost free from reading errors caused by nonuniformity of the substrate and for forming highly transparent films.

Cycloolefin random copolymer pellets prepared according to the present invention may contain various additives, for example, heat stabilizer, weathering stabilizer, antistatic agent, anti-slip agent, antiblocking agent, antifogging agent, lubricant, pigment, dye, natural oil, synthetic oil and wax, provided that the object of the invention is not marred.

Stabilizers to be used as optional components include, for example, phenolic antioxidants such as tetrakis[-methylene-3-(3,5-di-t-butyl-4-hydroxyphenyl) propionate]methane, alkyl ester of $\beta$-(3,5-di-t-butyl-4hydroxyphenyl) propionic acid and 2,2'-oxamidobis[ethyl-3-(3,5-di-t-butyl-4-hydroxyphenyl)]propionate; aliphatic acid metal salts such as zinc stearate, calcium stearate and calcium 12-hydroxystearate; and aliphatic acid esters of polyhydric alcohols such as glycerin monostearate, glycerin monolaurate, glycerin distearate, pentaerythritol monostearate, pentaerythritol distearate and pentaerythritol tristearate, and phosphorous-containing stablizers such as tris (2,4-di-t-butylphenyl)-phosphite. These stabilizers may be used singly or in combination. One of the examples of the combination is a co-use of tetrakis[methylene-3-(3,5-di-t-butyl-4-hydroxyphenyl) propionate]methane, tris (2,4-di-t-butylphenyl)phosphite, zinc stearate and glycerin monostearate.

In the present invention, particularly preferred is the use of the phenolic antioxidant and the aliphatic acid ester of polyhydric alcohol in combination. The aliphatic acid ester of polyhydric alcohol is preferably an aliphatic acid ester of polyhydric alcohol in which a part of alcoholic hydroxy group of the polyhydric alcohol having 3 or more hydroxy group is esterified. The aliphatic acid esters of polyhydric alcohols include, for example, aliphatic acid esters of glycerin such as glycerin monostearate, glycerin monolaurate, glycerin monomyristate, glycerin monopalmitate, glycerin distearate and glycerin dilaurate; and aliphatic acid esters of pentaerythritol such as pentaerythritol monostearate, pentaerythritol monolaurate, pentaerythritol dilaurate, pentaerythritol distearate and pentaerythritol tristearate. The phenolic antioxidant is used in an amount of 0 to 10 parts by weight, preferably 0 to 5 parts by weight, more preferably 0 to 2 parts by weight, based on 100 parts by weight of the cycloolefin resin. The polyhydric alcohol is used in an amount of 0 to 10 parts by weight, preferably 0 to 5 parts by weight, based on 100 parts by weight of the cycloolefin resin. The stabilizers are desirably added generally before melting of the cycloolefin random copolymer.

Further, in the present invention, the cycloolefin random copolymer pellets may include, provided that the object of the invention is not marred, fillers such as silica, diatomaceous earth, alumina, titanium oxide, magnesium oxide, pumice powder, pumice balloons, aluminum hydroxide, magnesium hydroxide, basic magnesium carbonate, dolomite, calcium sulfate, potassium titanate, barium sulfate, calcium sulfite, talc, clay, mica, asbestos, glass fibers, glass flakes, glass beads, calcium silicate, montmorillonite, bentonire, graphite, aluminum powder, molybdenum sulfide, boron fibers, silicon carbide fibers, polyethylene fibers, polypropylene fibers, polyester fibers and polyamide fibers.

EFFECT OF THE INVENTION

According to the process for preparing pellets of the present invention, the cycloolefin random copolymer pellets substantially not containing a low molecular weight cycloolefin random copolymer and an unreacted cycloolefin can be prepared through simple steps. Further, since the cycloolefin random copolymer pellets do not substantially contain a low molecular weight cycloolefin random copolymer and an unreacted cycloolefin, mold staining hardly takes place when a molded product is formed from the pellets.

Moreover, in the process for preparing cycloolefin random copolymer pellets according to the invention, the copolymer in the form of a liquid mixture is fed to the extruder, and thereby formation of by-products (e.g., cyclohexane-insoluble fine particles having a diameter of not less than 1 $\mu$m) caused by application of a shear stress to the cycloolefin random copolymer occurs at a lower level as compared with the conventional process. Hence, a molded product formed from the pellets is excellent in the optical properties as well as excellent in other properties such as heat resistance, thermal aging resistance, chemical resistance, solvent resistance, dielectric properties, rigidity and impact resistance. Accordingly, the cycloolefin random copolymer pellets prepared by the process of the invention can be widely used in various fields such as a field of optical materials, specifically high quality optical materials, e.g., optical memory discs, and a field of engineering plastics.

EXAMPLE

The present invention will be further described by examples, but it should be construed that the invention is in no way limited to those examples.

Measurements of various physical properties and evaluation methods thereof in the invention are described below.

Melt Flow Rate [MFR]

The melt flow rate [MFR] was measured at a temperatures of 260° C. under a load of 2,160 g.

Intrinsic Viscosity [η]

The intrinsic viscosity [η] was measured in decahydronaphthalene at 135° C. using an Atlantic type viscometer.

Copolymer Composition (% by mol)

The content (% by mol) of the cycloolefin component was determined by measuring a height of the peak of the absorption band (1,026 cm$^{-1}$) based on the cycloolefin component by means of infrared spectrophotometry. The content of ethylene was determined as the remainder in the copolymer.

Volatile Material [VM]

The amount (% by weight) of the volatile material [VM] remaining in the cycloolefin random copolymer pellets was determined by measuring a change in weight of the pellets under the conditions of a temperature of 190° C., a vacuum pressure of 1 Torr and a period of 1 hour.

Content of Unreacted Cycloolefin

The content of the unreacted cycloolefin was determined by dissolving the cycloolefin random copolymer pellets in cyclohexane and subjecting the resultant solution to gas chromatography.

Softening Temperature [TMA]

The softening temperature [TMA] was determined by heat distortion behavior of a sheet having a thickness of 1.0 mm formed from the cycloolefin random copolymer pellets using Thermomechanical Analyzer produced by Du Pont. In detail, a quartz needle was put on the sheet, and the sheet was heated at a heating rate of 5° C./min under a load of 50 g. The temperature at which the needle entered into the sheet by 0.1 mm was taken as the softening temperature [TMA].

EXAMPLE 1

Preparation of Catalysts

VO(OC$_2$H$_5$)Cl$_2$ was diluted with cyclohexane to prepare a vanadium catalyst having a vanadium concentration of 6.7 mmol/liter-cyclohexane. Separately, ethylaluminum sesquichloride (Al(C$_2$H$_5$)$_{1.5}$Cl$_{1.5}$) was diluted with cyclohexane to prepare an organoaluminum catalyst having an aluminum concentration of 107 mmol/liter-cyclohexane.

Polymerization

In a stirred vessel type polymerization reactor (inner diameter: 700 mm, reaction volume: 300 liters), copolymerization of ethylene and tetracyclo[4,4,0,1$^{2,5}$,1$^{7,10}$]-3-dodecene (cycloolefin, hereinafter sometimes referred to simply as "tetracyclododecene") was continuously carried out to prepare a cycloolefin random copolymer [B].

In this copolymerization, the vanadium catalyst prepared in the above was fed to the polymerization reactor in such an amount that the vanadium catalyst concentration in the cyclohexane, i.e., a polymerization solvent, in the polymerization reactor was 0.35 mmol/liter.

Separately, the above-prepared vanadium catalyst was beforehand diluted with cyclohexane, i.e., a polymerization solvent, so that the vanadium catalyst concentration in the resultant dilute solution (before feeding to the polymerizer) was 1.8 times as much as the catalyst concentration in the polymerization reactor. This dilute solution was also fed to the polymerizer.

Further, ethylaluminum sesquichloride, as an organoaluminum compound, was fed to the polymerization reactor in such an amount that a ratio (Al/V) of aluminum (Al) to vanadium (V) was 8.0.

Under the conditions of a polymerization temperature of 10° C. and a polymerization pressure of 1.0 kg/cm$^2$-G, the above-mentioned copolymerization was continuously carried out.

In a loop type reactor (internal tube diameter: 4B, external tube diameter: 6B, length: 32 m, vertical type), ethylene, tetracyclododecene and propylene (as an α-olefin) were copolymerized under the same conditions as for the preparation of the above-mentioned cycloolefin random copolymer [B] except that the pressure was 4 kg/cm$^2$-G, to prepare a cycloolefin random copolymer [C].

Deashing

The solution of the cycloolefin random copolymer [B] and the solution of the cycloolefin random copolymer [C], both solutions having being drawn out from the reactors, were introduced into a pipe to subject them to premixing. To the resultant mixture were added hot water of 80° C. and a NaOH solution (as a pH adjustor) having a concentration of 25% by weight, to terminate the copolymerization reaction and to remove the catalyst remaining in the copolymer solution (deashing procedure).

Prior to sending the mixed solution thus deashed to a phase separation zone, the mixed solution was transferred into a stirring vessel having an effective volume of 1.0 m$^3$ and stirred therein for 1 hour.

Phase Separation

The mixed copolymer solution (concentration: 5% by weight) transferred into the stirring vessel was led to the separation zone. With stirring in a 0.2 kiloliter stirring vessel in the separation zone, to the copolymer solution was added acetone in an amount of 20% by volume per 100% by volume of the copolymer solution.

At that time, the copolymer solution started to turn cloudy, that is, the solution reached the cloud point. To the copolymer solution was further added acetone, and at the time when the amount of acetone reached 55% by volume, the solution was continuously drawn out from the 0.2 kiloliter stirring vessel and transferred into a 2.7 kiloliter rest vessel.

Immediately after the copolymer solution was transferred into the rest vessel, a concentrated polymer solution starts to sediment. After residence time of 30 minutes, a concentrated phase containing the cycloolefin random copolymers relatively in a high concentration and a dilute phase containing them relatively in a low concentration were continuously drawn out from the vessel. The copolymer concentration in the concentrated phase was measured, and it was 34% by weight.

Further, the copolymer concentration in the dilute phase was measured, and it was 0.13% by weight, and the amount of the copolymer contained in the dilute phase was 3.2% by weight based on the amount of the copolymers contained in both the dilute and the concentrated phases. The average molecular weight of the copolymer contained in the dilute phase is not more than 1/10 as much as the average molecular weight of the whole copolymer used.

Pelletizing

The concentrated phase solution thus drawn out was fed to a double-tube type heater (external tube diameter: 2B, internal tube diameter: ⅜B, length: 21 m) in which water vapor of 25 kg/cm$^2$-G was used as a heating source in a feed rate of 30 kg/hr, and heated to 205° C.

The concentrated phase solution subjected to the heating as described above was then kneaded by means of a twin-screw extruder provided with multiple vents. The kneading was carried out using the vented extruder (intermesh type twin-screw extruder, screw diameter: 30 mm, L/D: 30, two-way rotation, number of back vent: 1, number of vacuum vent: 2) at a barrel temperature of 260° C. under a vacuum pressure of the vacuum vent portion of 5 Torr.

Through the kneading, most of the unreacted cycloolefin was exhausted from the back vent of the extruder together with the polymerization solvent. Further, the polymerization solvent (cyclohexane) and the unreacted cycloolefin still remaining in the copolymer could be removed mostly by the vacuum vents.

The copolymer was melt-extruded, and then filtered through a leaf type polymer filter made of SUS metal nonwoven fabric (nominal diameter: 5 μm, produced by Nippon Seisen K.K.), which was provided at the tip of the extruder, to obtain pellets having a diameter of about 3 mm.

Drying and Classification of Pellets

The obtained copolymer pellets were dried to remove moisture attached to the pellets, and classified to remove pellet-worn fine particles which had a weight of not more than 1/10 as much as the weight of the pellet, pellets having small diameters, fragments of broken pellets, fine foreign substances attached to the pellets, etc. by means of an air classification device.

The molecular weight of the cycloolefin random copolymer forming the obtained pellets (i.e., molecular weight of the copolymer recovered from the concentrated phase), the amounts of the unreacted cycloolefin and the V:M remaining in the pellets, the amount of the low molecular weight copolymer removed from the reaction system and the molecular weight thereof, and the molecular weight of the copolymer produced in the whole reaction system are set forth in Table 1.

COMPARATIVE EXAMPLE 1

The copolymer solution prepared and deashed in Example 1 was fed to a 200-liter stirring vessel at a feed rate of 261 kg/hr, and with intensive stirring in the vessel at ordinary temperature, to the copolymer solution was added acetone in an amount of 4.5 times by volume as much as the amount of the copolymer solution to precipitate a powdery cycloolefin random copolymer, so as to form a slurry.

The slurry was filtered through a filter, and wet cake attached to the filter filaments was separated by back washing with acetone. After extraction of the unreacted cycloolefin at 75° C. for 3 hours with keeping the slurry concentration of 20 g/liter-acetone, the slurry was cooled to 40° C. and centrifuged to remove the solvent, so as to obtain wet cake.

The wet cake was dried at 90° C. under atmospheric pressure for 1 hour by a Nara-type twin-paddle dryer, and then further dried at 90° C. under 10 Torr for 3 hours by a Tamagawa-type vacuum paddle dryer.

The dried product was pelletized by the use of an extruder (intermesh type twin-screw extruder, screw diameter: 44 mm, L/D: 30, two-way rotation, number of atmospheric pressure vent: 1) at a barrel temperature of 260° C.

The molecular weight; of the cycloolefin random copolymer forming the obtained pellets (i.e., molecular weight of the copolymer recovered from the slurry), the amount of the unreacted cycloolefin and the VM remaining in the pellets, the amount of the low molecular weight copolymer removed from the reaction system and the molecular weight thereof, and the molecular weight of the copolymer produced in the whole reaction system are set forth in Table 1.

COMPARATIVE EXAMPLE 2

The copolymer solution prepared and deashed in Example 1 was directly fed to a double-tube type heater (external tube diameter: 2B, internal tube diameter: ⅜B, length: 21 m) at a feed rate of 261 kg/hr without removing the low molecular weight polymer and the like by means of the phase separation as in Example 1, and was heated to 180° C.

Then, from the copolymer solution thus heated, the polymerization solvent and most of the unreacted cycloolefin were removed by the use of a double-tube type flash drier (external tube diameter: 2B, internal tube diameter: ⅜B, length: 27 m) and a flash hopper (volume: 200 liters). Water vapor of 25 kg/cm$^2$ was used as a heat source of the double-tube type flash dryer.

The copolymer subjected to the above flash drying was then kneaded using a vented extruder (intermesh type twin-screw extruder, screw diameter: 30 mm, L/D: 32, two-way rotation, number of back vent: 1, number of vacuum vent: 2) at a barrel temperature of 260° C. and a vacuum pressure of each vacuum vent portion of 5 Torr.

Pellets were prepared from the copolymer in the same manner as described in Example 1.

The molecular weight of the cycloolefin random copolymer forming the obtained pellets (i.e., molecular weight of the copolymer recovered from the concentrated solution after heating), the amount of the unreacted cycloolefin and the VM remaining in the pellets, the amount of the low molecular weight copolymer removed from the reaction system and the molecular weight thereof, and the molecular weight of the copolymer produced in the whole reaction system are set forth in Table 1.

TABLE 1

|  | Molecular weight of the copolymer prepared | Molecular weight of the copolymer recovered | Low molecular weight copolymer removed | | Unreacted cyclo-olefin in pellets (wt. %) | VM in pellets (wt. %) |
| --- | --- | --- | --- | --- | --- | --- |
|  |  |  | Amount (wt %) | Molecular weight |  |  |
| Ex. 1 | 67,800 | 76,700 | 3.2 | 5,500 | 0.04 | 0.07 |
| Comp Ex.1 | 67,800 | 70,000 | 0.3 | 1,500 | 0.02 | 0.10 |
| Comp. Ex.2 | 67,800 | 67,800 | — | — | 0.04 | 0.07 |

What is claimed is:

1. A process for preparing cycloolefin random copolymer pellets, comprising the steps of:

adding an organic polar solvent to a copolymer solution containing a cycloolefin random copolymer [A] obtained by copolymerizing ethylene and at least one cycloolefin represented by the following formula (I) or (II) in a hydrocarbon solvent in the presence of a catalyst, in an amount exceeding such an amount that the copolymer solution exhibits a cloud point, to give a liquid mixture;

separating the liquid mixture into a lower phase containing the cycloolefin random copolymer [A] in a high concentration and an upper phase containing the copolymer [A] in a low concentration;

feeding the lower phase seperated to an extruder where the solvents are removed and the cycloolefin random copolymer is melted during extrusion processing; and pelletizing the cycloolefin random copolymer:

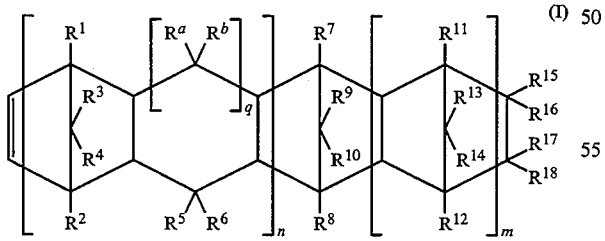
(I)

wherein n is 0 or 1; m is 0 or a positive integer; q is 0 or 1;

each of $R^1$–$R^{18}$, $R^a$ and $R^b$ is independently a hydrogen atom, a halogen atom or a hydrocarbon group;

$R^{15}$–$R^{18}$ may be linked with one another to form a monocyclic or polycyclic group which may have a double bond; and $R^{15}$ and $R^{16}$, or $R^{17}$ and $R^{18}$ may together form an alkylidene group; or

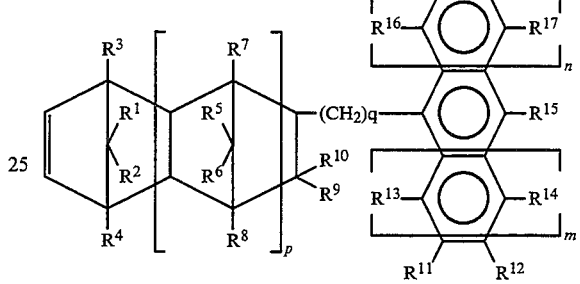
(II)

wherein each of p and q is independently 0 or an integer of or more; each of m and n is independently 0, 1 or 2;

each of $R^1$–$R^{19}$ is independently a hydrogen atom, a halogen atom, a hydrocarbon group or an alkoxy group; the carbon atom to which $R^9$ and $R^{10}$ are linked may be bonded directly or by way of an alkylene group of 1-3 carbon atoms to the carbon atom to which $R^{13}$ is linked or the carbon atom to which $R^{11}$ is linked; and $R^{15}$ and $R^{12}$, or $R^{15}$ and $R^{19}$ may be linked together to form a monocyclic or polycyclic aromatic ring when each of n and m is 0.

2. A process for preparing cycloolefin random copolymer pellets, comprising the steps of:

adding an organic polar solvent to a cycloolefin random copolymer solution comprising:

a solution containing a cycloolefin random copolymer [B] which is obtained by copolymerizing ethylene and at least one cycloolefin represented by the following formula (I) or (II) in a hydrocarbon solvent in the presence of a catalyst, and has an intrinsic viscosity [$\eta$], as measured in decahydronaphthalene at 135° C., of 0.05 to 10 dl/g and a softening temperature (TMA) of not lower than 70° C., and a solution containing a cycloolefin random copolymer [C] which is obtained by copolymerizing ethylene and at least one α-olefin other than ethylene and at least one cycloolefin represented by the following formula (I) or (II) in a hydrocarbon solvent in the presence of a catalyst, and has an intrinsic viscosity [$\eta$], as measured in decahydronaphthalene at 135° C., of 0.01 to 10 dl/g and a softening temperature (TMA) of lower than 70° C., the amount of said solution of the copolymer [C] being in the range of 1 to 100 parts by weight based on 100 parts by weight of the solution of the copolymer [B], in an amount exceeding such an amount that the cycloolefin random copolymer solution exhibits a cloud point, to give a liquid mixture;

separating the liquid mixture into a lower phase containing the cycloolefin random copolymers [B] and [C] in high concentrations and an upper phase containing the copolymers [B] and [C] in low concentrations;

feeding the lower phase solution to an extruder where the solvents are removed and the cycloolefin random copolymers are melted during extrusion processing; and pelletizing the cycloolefin random copolymer:

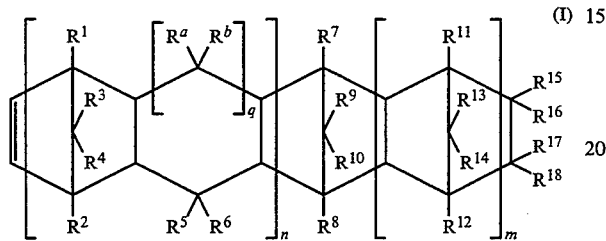

wherein n is 0 or 1; m is 0 or a positive integer; q is 0 or 1;

each of $R^1$-$R^{18}$, $R^a$ and $R^b$ is independently a hydrogen atom, a halogen atom or a hydrocarbon group;

$R^{15}$-$R^{18}$ may be linked with one another to form a monocyclic or polycyclic group which may have a double bond; and $R^{15}$ and $R^{16}$, or $R^{17}$ and $R^{18}$ may together form an alkylidene group; or

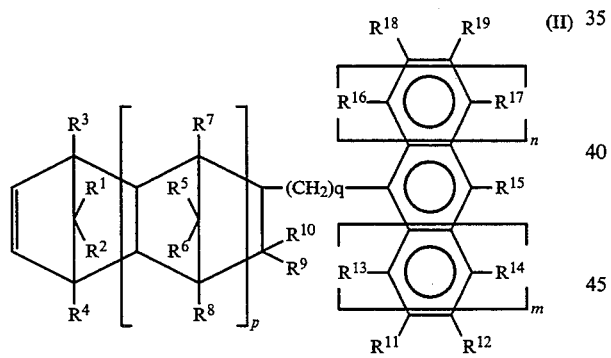

wherein each of p and q is independently 0 or an integer of 1 or more; each of m and n is independently 0, 1 or 2;

each of $R^1$-$R^{19}$ is independently a hydrogen atom, a halogen atom, a hydrocarbon group or an alkoxy group; the carbon atom to which $R^9$ and $R^{10}$ are linked may be bonded directly or by way of an alkylene group of 1-3 carbon atoms to the carbon atom to which $R^{13}$ is linked or the carbon atom to which $R^{13}$ is linked; and $R^{15}$ and $R^{12}$, or $R^{15}$ and $R^{19}$ may be linked together to form a monocyclic or polycyclic aromatic ring when each of n and m is 0.

3. A process for preparing cycloolefin random copolymer pellets, comprising the steps of:

adding an organic polar solvent to a cycloolefin random copolymer solution comprising:

a solution containing a cycloolefin random copolymer [B] which is obtained by copolymerizing ethylene and at least one cycloolefin represented by the following formula (I) or (II) in a hydrocarbon solvent in the presence of a catalyst, and has an intrinsic viscosity [η], as measured in decahydronaphthalene at 135° C., of 0.05 to 10 dl/g and a softening temperature (TMA) of not lower than 70° C., and a solution containing a cycloolefin random copolymer [D] which is obtained by copolymerizing ethylene, propylene and at least one cycloolefin represented by the following formula (I) or (II) or copolymerizing ethylene, 1-butene and at least one cycloolefin represented by the following formula (I) or (II) in a hydrocarbon solvent in the presence of a catalyst, and has an intrinsic viscosity [η], as measured in decahydronaphthalene at 135° C., of 0.01 to 10 dl/g and a softening temperature (TMA) of lower than 70° C., the amount of said solution of the copolymer [D] being in the range of 1 to 100 parts by weight based on 100 parts by weight of the solution of the copolymer [B], in an amount exceeding such an amount that the cycloolefin random copolymer solution exhibits the cloud point, to give a liquid mixture;

separating the liquid mixture into a lower phase containing the cycloolefin random copolymers [B] and [D] in high concentrations and an upper phase containing the copolymers [B] and [D] in low concentrations;

feeding the lower phase separated to an extruder where the solvents are removed and the cycloolefin random copolymers are melted during extrusion processing; and pelletizing the cycloolefin random copolymer:

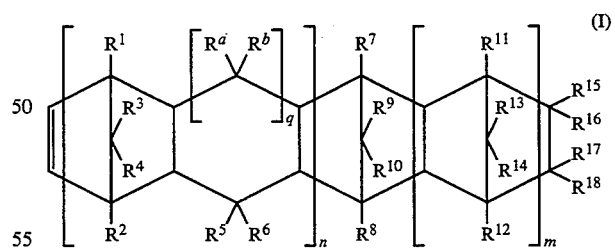

wherein n is 0 or 1; m is 0 or a positive integer; q is 0 or 1;

each of $R^1$-$R^{18}$, $R^a$ and $R^b$ is independently a hydrogen atom, a halogen atom or a hydrocarbon group;

$R^{15}$-$R^{18}$ may be linked with one another to form a monocyclic or polycyclic group which may have a double bond; and $R^{15}$ and $R^{16}$, or $R^{17}$ and $R^{18}$ may together form an alkylidene group; or

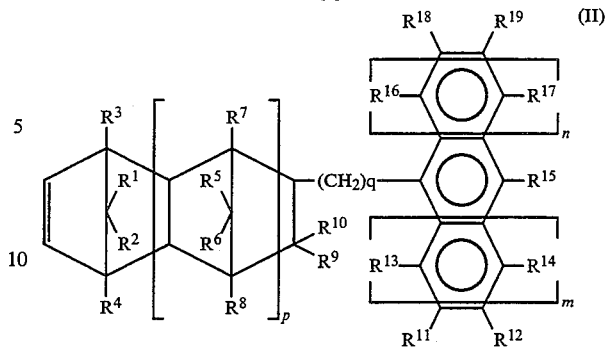

wherein each of p and q is independently 0 or an integer of 1 or more; each of m and n is independently 0, 1 or 2; each of $R^1$–$R^{19}$ is independently a hydrogen atom, a halogen atom, a hydrocarbon group or an alkoxy group; the carbon atom to which $R^9$ and $R^{10}$ are linked may be bonded directly or by way of an alkylene group of 1–3 carbon atoms to the carbon atom to which $R^{13}$ is linked or the carbon atom to which $R^{11}$ is linked; and $R^{15}$ and $R^{12}$, or $R^{15}$ and $R^{19}$ may be linked together to form a monocyclic or polycyclic aromatic ring when each of n and m is 0.

* * * * *